United States Patent
Lee et al.

(10) Patent No.: US 10,077,544 B2
(45) Date of Patent: Sep. 18, 2018

(54) DRINKING WATER SUPPLY DEVICE

(71) Applicant: LG ELECTRONICS INC., Seoul (KR)

(72) Inventors: Myounghoon Lee, Seoul (KR); Sangduck Lee, Seoul (KR); Jinpyo Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 250 days.

(21) Appl. No.: 14/963,327

(22) Filed: Dec. 9, 2015

(65) Prior Publication Data
US 2016/0168827 A1 Jun. 16, 2016

(30) Foreign Application Priority Data

Dec. 11, 2014 (KR) .................. 10-2014-0178357
Jan. 27, 2015 (KR) .................. 10-2015-0012623

(51) Int. Cl.
*E03B 7/07* (2006.01)
*G05D 16/20* (2006.01)
(Continued)

(52) U.S. Cl.
CPC .............. *E03B 7/075* (2013.01); *E03B 7/072* (2013.01); *E03B 7/074* (2013.01); *E03B 7/08* (2013.01);
(Continued)

(58) Field of Classification Search
CPC . E03B 7/08; E03B 7/072; E03B 7/074; E03B 7/075; G05D 11/03; G05D 11/001; G05D 11/13
See application file for complete search history.

(56) References Cited

U.S. PATENT DOCUMENTS 3,375,913 A * 4/1968 Norris, Jr. ............... G07F 13/00
                                                    194/240
3,442,800 A   5/1969 Jasionowski
                    (Continued)

FOREIGN PATENT DOCUMENTS

CN      1201925      12/1998
CN      1357489      7/2002
                (Continued)

OTHER PUBLICATIONS

English Translation for JPH06182360 published Jul. 1994.*
(Continued)

*Primary Examiner* — Anthony J Weier
(74) *Attorney, Agent, or Firm* — Ked & Associates, LLP

(57) ABSTRACT

A drinking water supply device may include a first channel configured to channel water, a water discharge pipe coupled to the rear end of the first channel configured to discharge the drinking water, a first connection pipe connecting the first channel and the water discharge pipe, a second channel configured to supply minerals to the first connection pipe, the second channel provided with a pressure sensor and a mineral supply valve, a mineral container configured to communicate with the first connection pipe via the second channel and configured to store condensed minerals, a pump configured to pressurize the interior of the mineral container to discharge the condensed minerals out of the mineral container, and a controller configured to control the mineral supply valve to open for a first predetermined time and then close according to a water discharge signal.

10 Claims, 11 Drawing Sheets

(51) Int. Cl.
  *G05D 7/06* (2006.01)
  *G05D 11/00* (2006.01)
  *G05D 11/03* (2006.01)
  *G05D 11/13* (2006.01)
  *E03B 7/08* (2006.01)

(52) U.S. Cl.
  CPC ........... *G05D 11/001* (2013.01); *G05D 11/03* (2013.01); *G05D 11/13* (2013.01)

(56) References Cited

U.S. PATENT DOCUMENTS

| | | | |
|---|---|---|---|
| 3,785,492 | A | 1/1974 | Mazza |
| 5,427,682 | A * | 6/1995 | Vogel .................... B01D 61/08 210/257.2 |
| 5,443,739 | A * | 8/1995 | Vogel .................... B01D 61/08 210/257.2 |
| 8,478,540 | B2 | 7/2013 | Uen et al. |
| 8,515,574 | B2 | 8/2013 | Studor et al. |
| 8,893,927 | B2 | 11/2014 | Olson et al. |
| 2003/0234212 | A1 | 12/2003 | Ito et al. |
| 2006/0070936 | A1* | 4/2006 | Kato ....................... C02F 1/688 210/192 |
| 2007/0199582 | A1* | 8/2007 | Kroon .................. B67D 1/0009 134/56 R |
| 2012/0055857 | A1* | 3/2012 | Marin ..................... C02F 1/004 210/97 |
| 2012/0285897 | A1* | 11/2012 | Fike ......................... C02F 9/00 210/743 |
| 2015/0059807 | A1 | 3/2015 | Behle et al. |

FOREIGN PATENT DOCUMENTS

| | | |
|---|---|---|
| CN | 101007661 | 8/2007 |
| CN | 101193825 | 6/2008 |
| CN | 201280452 | 7/2009 |
| CN | 102107941 | 6/2011 |
| CN | 102307639 | 1/2012 |
| CN | 102961050 | 3/2013 |
| CN | 203279755 | 11/2013 |
| CN | 103596473 | 2/2014 |
| CN | 103844897 | 6/2014 |
| CN | 103960983 | 8/2014 |
| JP | H 06-10198 | 2/1994 |
| JP | H06182360 | * 7/1994 |
| JP | 08071571 | * 3/1996 |
| JP | 11244895 | * 9/1999 |
| JP | 2000-254664 | 9/2000 |
| JP | 2000-357269 A | 12/2000 |
| JP | 2006-198555 | 8/2006 |
| JP | 2007-229293 | 9/2007 |
| JP | 2008-239166 | 10/2008 |
| JP | 2011-522568 | 8/2011 |
| JP | 50-34592 | 9/2012 |
| JP | 2015-500206 | 1/2015 |
| KR | 10-0032724 | 3/1986 |
| KR | 20-0197709 | 9/2000 |
| KR | 10-2003-0037237 | 5/2003 |
| KR | 20-0396242 | 9/2005 |
| KR | 10-0727676 | 6/2007 |
| KR | 10-0890213 | 3/2009 |
| KR | 10-2010-0076350 | 7/2010 |
| KR | 10-2012-0079002 | 7/2012 |
| KR | 10-2013-0062010 | 6/2013 |

OTHER PUBLICATIONS

U.S. Appl. No. 14/963,353, filed Dec. 9, 2015.
U.S. Appl. No. 14/963,418, filed Dec. 9, 2015.
Chinese Office Action (with English Translation) dated Feb. 23, 2018 issued in Application No. 201510919830.9.
U.S. Office Action dated Jan. 25, 2018 issued in co-pending U.S. Appl. No. 14/963,418.
U.S. Office Action dated Mar. 8, 2018 issued in co-pending U.S. Appl. No. 14/963,353.
Chinese Office Action (with English Translation) dated Dec. 19, 2017 issued in Application No. 201510919930.1.
Chinese Office Action (with English Translation) dated Jan. 17, 2018 issued in Application No. 201510920076.0.

* cited by examiner

FIG. 4A
FIG. 4B
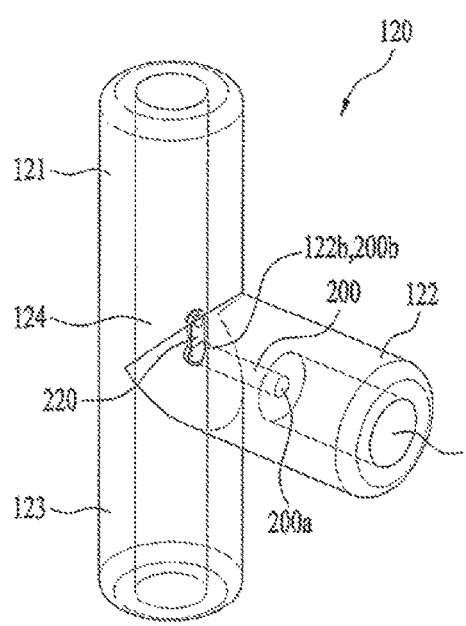
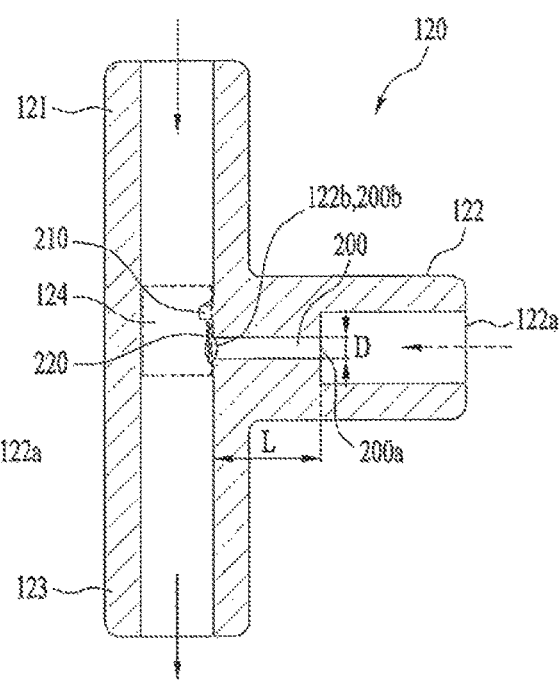

FIG. 8A
FIG. 8B
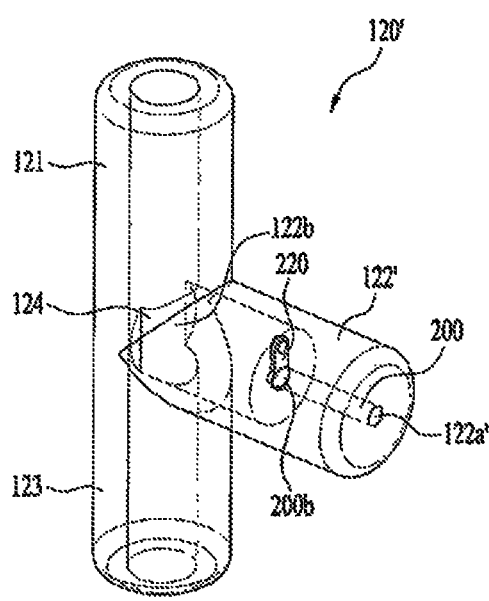
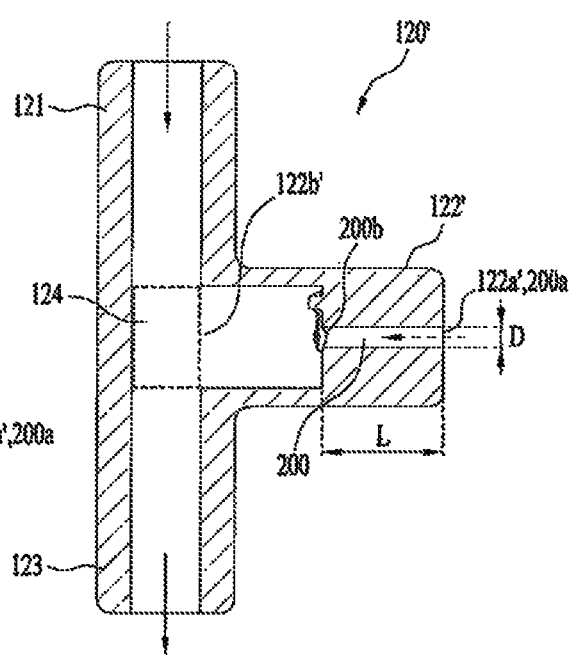

DRINKING WATER SUPPLY DEVICE

CROSS-REFERENCE TO RELATED APPLICATIONS

This application claims priority under 35 U.S.C. § 119 to Korean Application Nos. 10-2014-0178357, filed on Dec. 11, 2014, and 10-2015-0012623, filed on Jan. 27, 2015, whose entire disclosures are incorporated herein by reference.

BACKGROUND

1. Field

A drinking water supply device capable of supplying mineral water and a method of controlling a drinking water supply device are disclosed herein.

2. Background

In general, a drinking water supply device may be a device that supplies drinking water to a user. The drinking water supply device may be a stand-alone device or may constitute part of an electric home appliance, such as, e.g., a refrigerator.

A drinking water supply device may supply drinking water at room temperature. The drinking water supply device may cool drinking water using a cold water supply unit that includes a refrigeration cycle or may heat drinking water using a hot water supply unit that includes a heater. That is, the drinking water supply device may supply cold water or hot water to a user as needed.

Drinking water may be underground water, raw water or natural water supplied from a faucet, or clean water obtained by filtering raw water. Drinking water may be defined as drinkable water.

Drinking water supply devices may be capable of providing water other than clean water, cold water, or hot water. For example, the drinking water supply device may include a mineral water supply module. The mineral water supply module may provide mineral water that may contain a predetermined amount of minerals to a user.

Minerals may constitute one of five types of nutritional substances along with protein, fat, carbohydrates, and vitamins. Minerals may play an important part in biochemical activity such as, e.g., catalytic activity, in the human body and in the constitution of, for example, the bones and teeth. Mineral elements such as calcium (Ca), potassium (K), magnesium (Mg), and sodium (Na) may be important for metabolism.

Mineral water that may contain these minerals may play a supporting role in improving health, for example, discharging waste matter from the human body and promoting digestion. When a predetermined amount of minerals are in drinking water, the water may taste better than when the user drinks clean water.

To make mineral water in a drinking water supply device, mineral water supply modules, e.g., an electro-analyzer, a mineral filter, and/or a device for directly supplying condensed minerals to clean water, may be applied to the drinking water supply device. The device for directly supplying condensed minerals to clean water may be more compact than other mineral water supply modules.

For example, the mineral water supply module, which may directly supply condensed minerals to clean water, may be configured to have a structure in which minerals discharged from a mineral container in which condensed mineral liquid may be stored may be supplied to a water discharge pipe via a mineral supply pipe.

Conventional mineral water supply modules may have a mineral supply pipe with the same inner diameter as a water discharge pipe. As a result, the amount of minerals supplied may easily vary depending upon a pressure from a pump configured to pressurize the mineral supply pipe. That is, the amount of minerals discharged may change so that the variation in concentration of minerals in mineral water discharged may be high. Thus, the mineral water may taste differently every time a user drinks the water.

When clean water is supplied after mineral water has been discharged, minerals remaining in the mineral supply pipe may be easily introduced into the clean water. As a result, a large amount of minerals may be discharged so that the clean water provided may taste different.

To directly supply condensed minerals to clean water, a mineral container may be provided to store condensed minerals, and a mineral supply line may connect the mineral container and a drinking water supply line to introduce the condensed minerals to drinking water.

The drinking water supply device may have a quantitative control mode in which a predetermined amount of drinking water may be supplied to a user and a real time control mode in which a desired amount of drinking water may be supplied to the user in real time. In the quantitative control mode, the user may input a command through a quantitative control input unit or quantitative controller provided at the drinking water supply device such that the drinking water supply device may supply a predetermined amount of drinking water.

In the real time control mode, the user may use a drinking water discharge button or lever provided at the drinking water supply device instead of inputting a command through the quantitative controller such that the drinking water supply device may supply a desired amount of drinking water to the user in real time.

The user may wish to drink mineral water having a uniform taste regardless of whether the quantitative control mode or the real time control mode may be active. To supply mineral water having a uniform taste to the user, variation in the amount of minerals supplied to drinking water based on the amount of the drinking water may be reduced.

For example, in the quantitative control mode, a valve provided in the mineral supply line may be controlled to be turned on or off for a time when pressure in the mineral supply line may be maintained at a predetermined level so a predetermined amount of minerals or condensed minerals may be supplied to drinking water, e.g., clean water, cold water, or hot water.

If the pressure in the mineral supply line deviates from a predetermined range of pressure, the amount of minerals supplied to drinking water may differ from the predetermined amount of minerals with the result that the mineral water may taste different from a predetermined taste.

In addition, when the pressure in the mineral supply line is lower than the predetermined range of pressure, a pump, e.g., an air pump, may be utilized in order to increase the pressure in the mineral supply line to the predetermined range of pressure.

As mainly a pressure at a specific point in the mineral supply line may be sensed, an average pressure of the entire mineral supply line with a predetermined length may not be obtained. That is, the pressure may be distributed in a longitudinal direction of the mineral supply line with a predetermined length, and an error may occur in sensing the pressure in the mineral supply line due to the distribution of the pressure.

When the pump operates to increase the pressure in the mineral supply line based on the sensed pressure in the mineral supply line, the pressure in the mineral supply line may exceed the predetermined pressure due to various causes, such as, e.g., pump operation time, compression load, and/or the distance between a portion where the pressure is sensed and the pump.

When the pressure in the mineral supply line is higher than the predetermined range of pressure, it may not be possible to reduce the pressure in the mineral supply line through the control of the pump.

In addition, when the mineral container provided in the mineral water supply module is replaced, minerals remaining in the mineral container may flow outside the mineral container if the minerals are not discharged in advance.

BRIEF DESCRIPTION OF THE DRAWINGS

The embodiments will be described in detail with reference to the following drawings in which like reference numerals refer to like elements wherein:

FIG. 4A is a perspective view of a mineral water generation unit according to an embodiment;

FIG. 4B is a cross-sectional view of the mineral water generation unit of FIG. 4A showing a flow direction;

FIG. 8A is a perspective view of a mineral water generation unit according to another embodiment;

FIG. 8B is a cross-sectional view of the mineral water generation unit of FIG. 8A showing a flow direction;

DETAILED DESCRIPTION

In the following description, water that has yet to pass through a filter will be defined as raw water, raw water that has passed through a filter will be defined as clean water, and raw water or clean water containing minerals will be defined as mineral water. Raw water and clean water may be defined as drinking water, or water that a user may drink.

In addition, a front end and a rear end may mean an upstream side and a downstream side in a direction in which a fluid flows forward. The forward flowing direction is a direction in which drinking water flows in a drinking water supply device before the drinking water is discharged out of the drinking water supply device.

Figure 1:
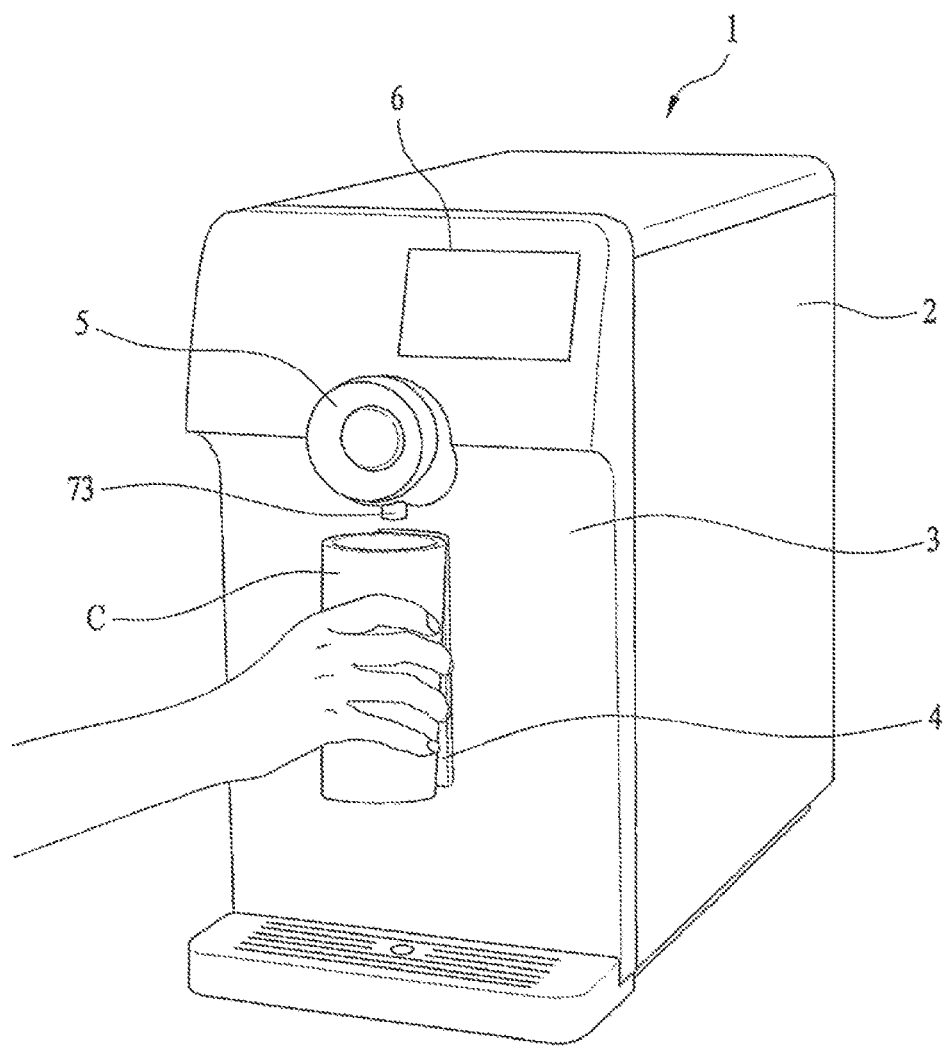
FIG. 1 is a perspective view showing an external appearance of a drinking water supply device according to an embodiment.

FIG. 1 is a perspective view showing an external appearance of a drinking water supply device according to an embodiment. A drinking water supply device 1 may include a cabinet 2 that forms an external appearance of the drinking water supply device 1 and a dispenser 3. The dispenser 3 may be a space in which drinking water may be supplied to a user. The dispenser 3 may be formed on a front or side of the cabinet 2.

The dispenser 3 may be provided with a cock 73 through which drinking water may be discharged. The dispenser 3 may also be provided with a real time control unit or controller 4 and a quantitative control unit or controller 5 configured to control the discharge of drinking water.

The real time controller 4 may be in a shape of a lever that may be pushed or pulled. The quantitative controller 5 may be formed in the shape of a button that may be pushed. Alternatively, the quantitative controller 5 may be controlled by touch from a user.

The user may input a command through the quantitative controller 5 so the drinking water supply device 1 may operate in a quantitative control mode. In the quantitative control mode, the drinking water supply device 1 may be controlled to discharge a predetermined amount of drinking water through the cock 73.

The user may push or pull the real time controller 4, which may be formed in the shape of a lever, rather than inputting a command through the quantitative controller 5. For example, after the user places a cup C under the cock 73, the user may push or pull the lever to fill the cup C with drinking water discharged through the cock 73.

The drinking water supply device 1 may operate in a real time control mode. In the real time control mode, the drinking water supply device 1 may be controlled to discharge drinking water through the cock 73 based on a time period during which the user pushes or pulls the lever. That is, when the user manipulates the lever and does not input a command through the quantitative controller 5, the drinking water supply device 1 may operate in the real time control mode.

The drinking water supply device 1 may further include a mineral water supply module configured to supply minerals to drinking water discharged from the drinking water supply device 1. The drinking water supply device 1 may supply drinking water containing minerals, or mineral water, to the user through the mineral supply module.

The drinking water supply device 1 may be further provided with a display 6 to indicate, for example, a time when a mineral container provided in the mineral water supply module may need to be replaced. The display 6 may be provided separately from the quantitative controller 5, as shown in FIG. 1. Alternatively, the display 6 may be provided with or in the quantitative controller 5.

According to an embodiment shown in FIG. 1, a drinking water supply device 1 may be a stand-alone device. The drinking water supply device 1 may also constitute a part of another device, for example, a refrigerator.

In the following description, the drinking water supply device 1 may be operating in the quantitative control mode unless otherwise mentioned.

Figure 2:
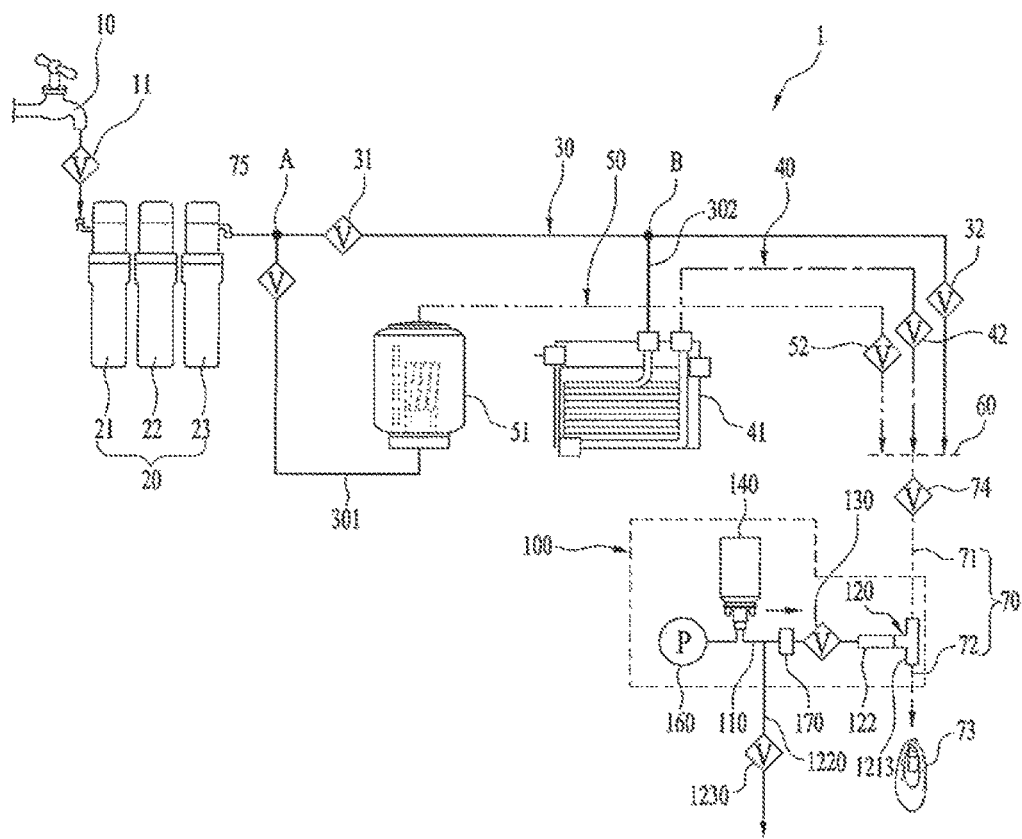
FIG. 2 is a conceptual view of a drinking water supply device according to an embodiment.

FIG. 2 is a conceptual view of the drinking water supply device showing a structure and pipe arrangement according to an embodiment. A drinking water supply device 1 according to the embodiment may convert raw water that may be introduced into the drinking water supply device 1 through an external water tap 10 into clean water using a filter unit 20.

The construction of the filter unit 20 may vary. A plurality of single filters 21, 22, and 23 may constitute the filter unit 20. For example, the filter unit 20 may include, e.g., a pre-carbon filter 21, an ultra-filtration (UF) filter 22, and a post-carbon filter 23. When raw water is filtered by the filter unit 20 into clean water, the clean water may be discharged out of the drinking water supply device 1 through a clean water pipe 30, a clean water supply valve 32, and the cock 73, for example.

According to an embodiment, the drinking water supply device 1 may be configured to supply cold water or hot water according to the demand of the user. Heated clean water or hot water may be discharged out of the drinking water supply device 1, for example, through a first branch clean water pipe 301 that may diverge from point A of the clean water pipe 30 and may be located at the rear end of the filter unit 20, a heating unit 51, a hot water pipe 50, a hot water supply valve 52, and the cock 73.

Cooled clean water or cold water may be discharged out of the drinking water supply device 1, for example, through a second branch clean water pipe 302 that may diverge from a point B that may be further downstream than point A of the clean water pipe 30, a cooling unit 41, a cold water pipe 40, a cold water supply valve 42, and the cock 73.

According to an embodiment shown in FIG. 2., clean water, cold water, and hot water may be discharged through a single cock 73. Cocks for discharging the clean water, the cold water, and the hot water may be provided separately. The clean water and the cold water may be discharged through one cock, and the hot water may be discharged through another cock.

A cock valve or a first valve 74 may be provided at a rear end or a downstream side of the clean water supply valve 32, the cold water supply valve 42, and the hot water supply valve 52. The cock valve 74 may be connected to a distribution pipe 60. The distribution pipe 60 may be connected to the clean water pipe 30, the cold water pipe 40, and the hot water pipe 50.

A water discharge pipe 70, through which clean water, cold water, or hot water may be supplied, may be provided at the rear end of the cock valve 74. Clean water, cold water, or hot water may be supplied into the distribution pipe 60, and, when the cock 73 is opened by the cock valve 74, the clean water, the cold water, or the hot water may be selectively supplied through the water discharge pipe 70.

The mineral water supply module 100, which may supply minerals to drinking water flowing in the water discharge pipe 70, may be connected to the water discharge pipe 70. The mineral water supply module 100 may be connected to a side of the water discharge pipe 70 via a first connection pipe 120 that may be connected to the water discharge pipe 70. The first connection pipe 120 may function as a mineral water generation unit, in which minerals are mixed with drinking water.

The water discharge pipe 70 may include a first channel 71 connected to the front end of the first connection pipe 120 and a water discharge channel 72 connected to the rear end of the first connection pipe 120.

When the cock valve 74 is opened, clean water, cold water, or hot water may flow into the first channel 71 toward the cock 73 and may be introduced into the first connection pipe 120 before the clean water, the cold water, or the hot water may be discharged through the cock 73.

The first channel 71 may be provided at an upstream side of the first connection pipe 120 to supply drinking water, e.g., clean water, cold water, or hot water, to the first connection pipe 120. That is, the first channel 71 may be a pipe through which clean water, cold water, or hot water may be selectively discharged and introduced into the first connection pipe 120 when the cock 73 is opened. The water discharge channel 72 may be provided between the first connection pipe 120 and the cock 73 to selectively discharge mineral water made in the first connection pipe 120 through the cock 73.

A mineral water supply module 100 according to an embodiment may include a mineral container 140 configured to store condensed mineral liquid, a pump 160 configured to pressurize the mineral container 140 to discharge minerals, a second channel 110 connecting the first connection pipe 120 and the mineral container 140, a pressure sensor 170 provided in the second channel 110, and a mineral supply valve or a second valve 130 provided in the second channel 110 to selectively supply minerals to the first connection pipe 120.

Minerals supplied from the mineral water supply module 100 to the first connection pipe 120 may be highly concentrated condensed minerals. The mineral container 140 may store condensed mineral liquid in which minerals, such as, e.g., calcium (Ca), potassium (K), magnesium (Mg), and sodium (Na), may be mixed. For example, the concentration of minerals in the condensed mineral liquid stored in the mineral container 140 may be about 200 times the average concentration of minerals contained in clean water.

The amount of minerals supplied from the mineral water supply module 100 to the first connection pipe 120 may determine the taste of the mineral water discharged through the cock 73. The amount of minerals supplied from the mineral water supply module 100 to the first connection pipe 120 may be much smaller than the flow rate of drinking water, e.g., clean water, cold water, or hot water, flowing in the first connection pipe 120. According to experimental results of an embodiment disclosed herein, the amount of condensed mineral liquid to make mineral water with a taste user's like is 0.0006 parts per part of clean water.

A second pipe 122 may be provided to supply a small amount of minerals to the first connection pipe 120. That is, condensed minerals may be supplied to the drinking water flowing in the first connection pipe 120 through the second pipe 122.

For example, the first connection pipe 120 may be in a T shape. The first connection pipe 120 may be provided with a mixing pipe 1213 provided between the first channel 71 and the water discharge channel 72 parallel to the first channel 71 and the water discharge channel 72 and a second pipe 122 may be configured to supply condensed minerals to the mixing pipe 1213 in a direction perpendicular to the mixing pipe 1213.

The drinking water supply device 1 according to an embodiment may further include a drainage module 1200 configured to discharge minerals to the outside of the drinking water supply device 1. The drainage module 1200 may include a drainage channel 1220 configured to communicate with one side of the second channel 110 and a drainage valve 1230 that may be provided in the mineral water supply module according to an embodiment When the drainage valve 1230 is opened, condensed minerals remaining in the mineral container 140 may sequentially pass through the second channel 110 and the drainage channel 1220 and may then be discharged to the outside.

Figure 3:
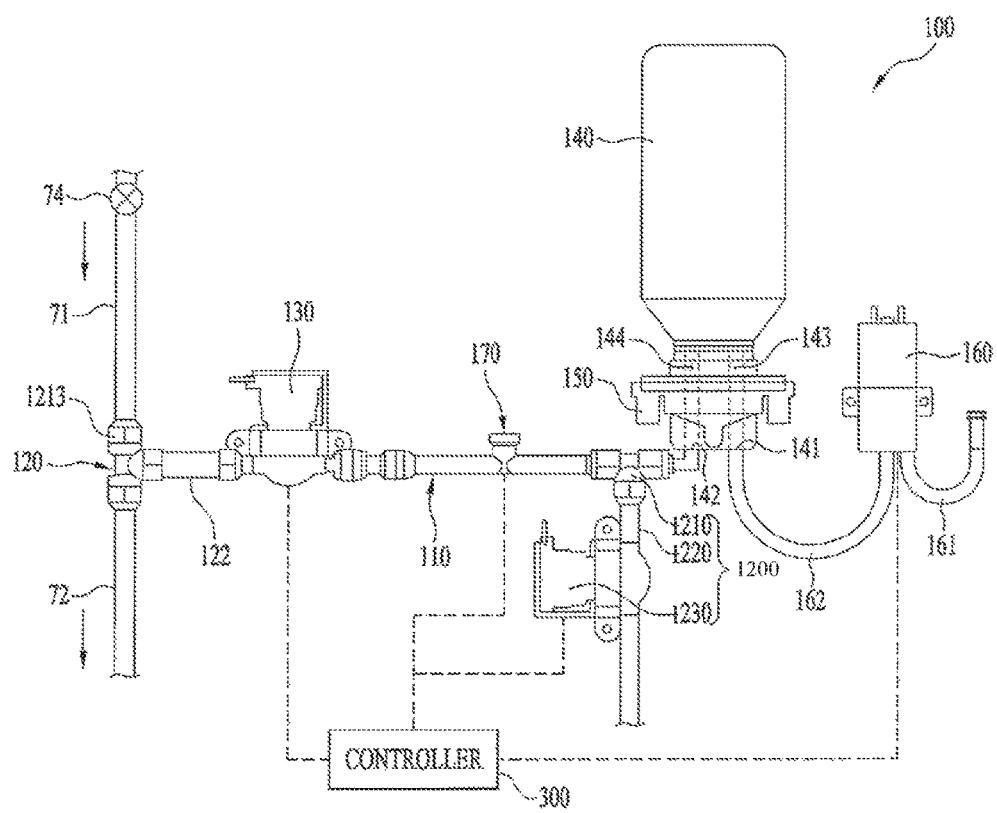
FIG. 3 is a schematic view of a mineral water supply module and a drainage module according to an embodiment.

FIG. 3 is a schematic view of a mineral water supply module and a drainage module according to an embodiment. Hereinafter, the cock valve 74 in the above description will be called a first valve 74.

According to embodiments as shown in FIGS. 2 and 3, a drinking water supply device 1 may include a water discharge pipe 70, a first valve 74 configured to selectively open and close the water discharge pipe 70, a first connection pipe 120 of a mineral supply line extending to a side of the water discharge pipe 70, a second channel 110 configured to supply minerals to the first connection pipe 120, a mineral container 140 configured to store condensed minerals, and a pump 160 configured to pressurize the mineral container 140.

The water discharge pipe 70 may be provided with a first channel 71 and a water discharge channel 72. The first channel 71 may be located further upstream than the water discharge channel 72. The first channel 71 may be configured such that drinking water flows in the first channel 71, and the first channel 71 may be provided with a first valve 74 that selectively opens and closes the first channel 71.

The water discharge channel 72 may be connected to a rear end of the first channel 71 to discharge drinking water. That is, drinking water may sequentially flow through the first channel 71 and the water discharge channel 72 and may then be discharged through the cock 73.

The first connection pipe 120 may be provided between and may connect the first channel 71 and the water discharge channel 72. The first connection pipe 120 may be in a T shape and may be provided with a mixing pipe 1213 to guide the drinking water from the first channel 71 to the water discharge channel 72 and a second pipe 122 that defines a condensed mineral channel extending perpendicular to the mixing pipe 1213.

When condensed minerals are guided to the mixing pipe 1213, the pressure applied to the condensed minerals may be reduced while the condensed minerals pass through the second pipe 122. The cross-sectional diameter of the second pipe 122 may be less than the length of the second pipe 122, and the cross-sectional area of the second pipe 122 may be less than the cross-sectional area of the mixing pipe 1213, for example. Thus, it may be possible to accurately control the amount of condensed minerals guided to the mixing pipe 1213.

The second channel 110 may be configured to supply minerals, for example, condensed minerals, to the first connection pipe 120. That is, the second channel 110 may be formed as a mineral supply pipe or a mineral supply line. An end of the second channel 110 may be connected to the first connection pipe 120. For example, an end in a longitudinal direction of the second channel 110 may be connected to the second pipe 122 of the first connection pipe 120.

The pressure at which condensed minerals may be supplied through the second channel 110 may be reduced by the second pipe 122. That is, the second pipe 122 may reduce the pressure at which condensed minerals may be supplied through the second channel 110.

A second valve or a mineral supply valve 130 and a pressure sensor 170 may be provided in the second channel 110. The second valve 130 may be configured to selectively open and close the second channel 110, and the pressure sensor 170 may be configured to sense the pressure in the second channel 110 or the pressure at which condensed minerals flow in the second channel 110.

The second valve 130 may be provided in the second channel 110 such that the second valve 130 may be closer to the first connection pipe 120 than the pressure sensor 170. That is, the pressure sensor 170 may be provided further upstream of the second channel 110 than the second valve 130.

A mineral container 140 may be configured to store condensed minerals. The mineral container 140 may be connected to the first connection pipe 120 via the second channel 110. For example, a first end in a longitudinal direction of the second channel 110 may be connected to the first connection pipe 120, and a second end in a longitudinal direction of the second channel 110 may be connected to the mineral container 140.

A pump 160 may be configured to pressurize an interior of the mineral container 140 to discharge the condensed minerals stored in the mineral container 140. For example, the pump 160 may be an air pump. The pump 160 may be an air pump that may suction external air and inject the suctioned air into the mineral container 140.

Thus, the pump 160 may suction external air and inject the suctioned air into the mineral container 140 to increase the pressure in the mineral container 140. When the pump 160 injects external air into the mineral container 140, the condensed minerals stored in the mineral container 140 may be discharged out of the mineral container 140 due to an increase of the pressure in the mineral container 140.

The condensed minerals discharged out of the mineral container 140 may flow into the second channel 110. As a result, the pressure in the second channel 110 may increase. The pressure in the mineral container 140 may be equal to the pressure in the second channel 110 as the interior of the mineral container 140 may communicate with the second channel 110.

A lower part of the mineral container 140 may be provided with an injection hole 141 through which external air may be injected into the mineral container 140 and a discharge hole 142 through which the condensed minerals may be discharged from the mineral container 140.

The condensed minerals stored in the mineral container 140 may be directed to the lower side of the mineral container 140 due to gravity. The mineral container 140 may be more airtight because the injection hole 141 and the discharge hole 142 may be formed at the lower part of the mineral container 140.

According to embodiments disclosed herein, a drinking water supply device 1 may further include a container fastening unit or container fastener 150 that may be configured to fasten to or at a lower side of the mineral container 140. An injection hole 141 and the discharge hole 142 may be formed at the lower end of the container fastener 150.

The container fastener 150 may be provided with an air injection channel 143 that communicates with the injection hole 141 and a mineral discharge channel 144 that communicates with the discharge hole 142. The injection hole 141 may communicate with an interior of the mineral container 140 through the air injection channel 143, and the discharge hole 142 may communicate with the interior of the mineral container 140 through the mineral discharge channel 144.

An air introduction line 161 that communicates with the outside to introduce external air into the pump 160 and a third channel 162 that guides the external air discharged from the pump 160 to the mineral container 140 may be coupled to the pump 160.

The injection hole 141 may be connected to or may communicate with the pump 160 through the third channel 162, and the discharge hole 142 may be connected to or may communicate with the second channel 110.

As the pump 160, e.g., the air pump, may be configured to inject air into the mineral container 140, the airtightness of the mineral container 140 may be maintained in order to discharge the required amount of condensed minerals from the mineral container 140.

As the mineral container 140 may be provided at or on the upper side of the container fastener 150, and the injection hole 141 and the discharge hole 142 may be provided at the lower end of the container fastener 150, the mineral container 140 may be more airtight.

The second channel 110, the first connection pipe 120, the second valve 130, the mineral container 140, the container fastener 150, to which the mineral container 140 may be fastened, and the pump 160 may constitute a mineral water supply module 100 that may be separately coupled to the drinking water supply device 1.

According to embodiments disclosed herein, the drinking water supply device 1 may further include a drainage module 1200 configured to discharge condensed minerals remaining in the mineral container 140 outside the drinking water supply device 1. The drainage module 1200 may be separately coupled to a side of a mineral water supply module 100. The drainage module 1200 may be configured to discharge condensed minerals that remain in at least one selected from among the second channel 110, the mineral container 140, and the container fastener 150.

Condensed minerals that remain in the second channel 110 may be at a part defined between the second valve 130 and the container fastener 150. The remaining condensed minerals in the second channel 110, the mineral container 140, and the container fastener 150 may be discharged to the outside to prevent the remaining condensed minerals from overflowing to the outside when replacing the mineral container 140. The drainage module 1200 may be configured to discharge at least some of the remaining condensed minerals to reduce the pressure in the second channel 110 even when the mineral container 140 may not be replaced.

As an interior of the second channel 110 may communicate with the interior of the mineral container 140, pressure equilibrium may be maintained between the second channel 110 and the mineral container 140. When the pressure in the second channel 110 is reduced by discharging the condensed minerals remaining in the second channel 110, the pressure in the mineral container 140 may also be reduced.

The drainage module 1200 may include a second connection pipe 1210 provided between the mineral container 140 and the second channel 110, and a drainage channel 1220 that may connect to or communicate with the second connection pipe 1210. The drainage channel 1220 may be provided with a drainage valve or a third valve 1230.

The second connection pipe 1210 may connect the mineral container 140 and the second channel 110. In addition, the second connection pipe 1210 may be connected to the drainage channel 1220. The second connection pipe 1210 may be provided between the second channel 110 and the container fastener 150. The second connection pipe 1210 may be connected between the second channel 110 and the container fastener 150 and may be connected to the drainage channel 1220. The second connection pipe 1210 may be in a T shape.

Referring to FIG. 2, a mineral water supply module 100 may include a first channel 71 configured to supply clean water, a second channel 110 configured to supply minerals, and a water discharge channel 72 through which clean water or clean water containing minerals, e.g., mineral water, may be selectively discharged based on whether or not the minerals may be supplied.

The mineral water supply module 100 may be provided with a mineral container 140 configured to store condensed minerals and to supply the stored condensed minerals to the second channel 110 and with a pump 160 configured to pressurize the mineral container 140 or the second channel 110 to discharge the minerals stored in the mineral container 140 to the second channel 110. The pump 160 may be connected to the second channel 110.

A second valve 130 may be provided in the second channel 110 to selectively open and close the second channel 110 based on whether or not mineral water should be made. The second valve 130 may be provided at a rear end of the mineral container 140. The second valve 130 may be provided in the second channel 110 such that the second valve 130 may be adjacent to the first channel 71.

The mineral container 140 may be connected to the second channel 110 via the container fastener 150 connecting the second channel 110 to the mineral container 140. The mineral container 140 may be separately connected to the container fastener 150 such that the mineral container 140 may be easily replaced when the minerals in the mineral container 140 may be consumed or when the minerals contained in the mineral container 140 may not have been used for a long time.

The mineral water supply module 100 may be configured as a compact-sized module type unit that includes a second channel 110, a replaceable mineral container 140, a pump 160, and a second valve 130. The mineral water supply module 100 may be applied to various drinking water supply devices.

The mineral water supply module 100 may include a first connection pipe 120 in which clean water from the first channel 71 and minerals supplied from the second channel 110 may be mixed to form mineral water.

A first pipe 121 that connects to the first channel 71, a second pipe 122 that connects to the second channel 110, and a third pipe 123 that connects to the water discharge channel 72 may be formed at the first connection pipe 120. That is, the first pipe 121 and the third pipe 123 may constitute the mixing pipe 1213.

According to embodiments described herein, a micro channel 200 defining a micro mineral supply line through which a micro amount of minerals may be supplied may be provided in the second pipe 122 to provide mineral water in which the variation in concentration of minerals may be minimized. The micro channel 200 may define a channel in which a micro amount of minerals uniformly flow for a predetermined time in order to minimize the variation in amount of minerals that may be discharged.

FIGS. 4 to 7 show a first connection pipe according to an embodiment. Referring to FIGS. 4A and 4B, a first connection pipe 120 may include a first pipe 121 that connects to the first channel 71, a second pipe 122 that connects to the second channel 110, and a third pipe 123 that connects to the water discharge channel 72.

A mixing space 124 in which minerals are mixed with clean water may be provided between the first pipe 121 and the second pipe 122. The second pipe 122 may be connected to the first pipe 121 at a predetermined angle relative to the first pipe 121.

Clean water introduced from the first channel 71 may flow in a first direction in the first pipe 121, and minerals introduced from the second channel 110 may flow differently in a second direction in the second pipe 122. The clean water flowing in the first direction and the minerals flowing in the second direction may be introduced into the mixing space 124. The minerals may collide with the clean water in the mixing space 124 and may be easily mixed with the clean water.

The third pipe 123 may be connected to the first pipe 121 such that a fluid may flow in the third pipe 123 in the first direction. Clean water or mineral water generated in the mixing space 124 may flow in the first direction and may then be discharged through the third pipe 123. The inner diameter of the second pipe 122 may vary to adjust the amount of minerals discharged in a direction that the minerals flow.

An introduction end 122a through which minerals are introduced from the second channel 110 to the second pipe 122 may be provided at the second pipe 122 that connects to the second channel 110. The inner diameter of the introduction end 122a may be equal to the inner diameter of the second pipe 122. The introduction end 122a may extend a predetermined length in the direction that the minerals flow.

According to embodiments, a micro channel 200 provided between the introduction end 122a and a discharge end 122b may be provided in the second pipe 122. The discharge end 122b may be provided at an extremity of the second pipe 122. Minerals introduced into the micro channel 200 may be discharged into the mixing space 124 through the discharge end 122b.

The micro channel 200 may function to supply a micro amount of minerals to the mixing space 124 for a predetermined amount of time to minimize the variation in concentration of minerals in the mineral water discharged. For example, 0.075 ml of minerals may be required for 120 ml of clean water in order to generate one cup of mineral water. That is, the amount of condensed mineral liquid that may be required to generate mineral water is 0.0006 parts per part of clean water. In order to provide mineral water that tastes the same every time within an allowable deviation, a predetermined fixed amount of minerals may be supplied for a predetermined time.

It may be possible to reduce the inner diameter of the first channel 71 to generate mineral water and reduce the amount of clean water that may be supplied. When the inner diameter of the first channel 71 is reduced, it may not be possible to provide drinking water to the user within a short amount of time, thus limiting the reduction of the inner diameter of the first channel 71.

According to embodiments disclosed herein, an amount of minerals discharged from a second channel 110 may be adjusted using a micro channel 200. The micro channel 200 may have a small diameter in order to supply a predetermined and very small amount of minerals to the mixing space 124 for a predetermined time. In addition, the micro channel 200 may have a predetermined length in order to induce a loss in pressure of a fluid.

The micro channel 200 may be in a cylindrical shape that has a predetermined diameter D and a predetermined length L. When the pressure from the pump 160 is uniform, the amount of minerals discharged from the micro channel 200 may be decided based on the diameter and the length of the micro channel 200.

The diameter of the micro channel 200 may range from 0.5 mm to 1.0 mm. The minimum diameter of the micro channel 200 may be 0.5 mm. If the minimum diameter of the micro channel 200 is less than 0.5 mm, it may not be easy to mold or machine the micro channel 200 and may result in lower productivity.

The maximum diameter of the micro channel 200 may be predetermined or set such that a predetermined and very small amount of minerals may be supplied for a predetermined time. The diameter of the micro channel 200 may be predetermined or set so clean water may be discharged within an allowable deviation in taste after the mineral water is discharged. That is, the diameter of the micro channel 200 may be set or predetermined so the minerals that remain in the micro channel 200 may be minimal in the clean water discharged after the mineral water is discharged.

Thus, the maximum diameter of the micro channel 200 of the mineral water supply module 100 may be 1.0 mm. The diameter of the micro channel 200 may be derived based on the first channel having an outer diameter of 6.35 mm and the pump having a discharge flow rate of 0.1 ml/s to 1 ml/s.

Figure 5:
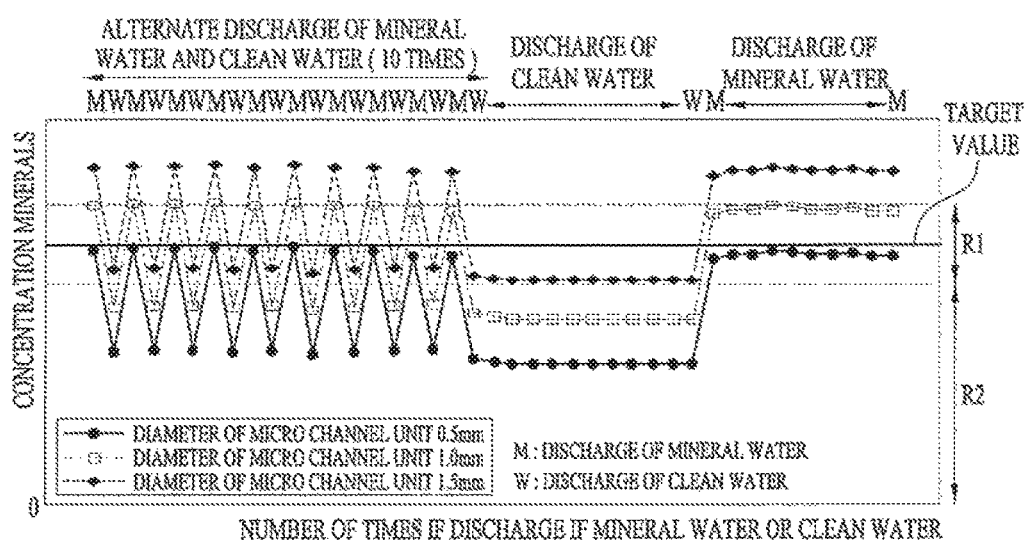
FIG. 5 is a graph showing a change in concentration of minerals based on a diameter of a micro channel when mineral water or clean water may be discharged from the mineral water supply module according to an embodiment.

FIG. 5 is a graph showing a change in concentration of minerals based on a diameter of a micro channel when mineral water or clean water may be discharged. A mineral water supply module 100 according to an embodiment may provide mineral water or clean water to the user. The user may distinguish between mineral water and clean water based on taste.

Mineral water may have a unique taste and may be distinguished from clean water based on the kind of minerals contained in the mineral water. In general, clean water may contain a predetermined amount of minerals even when additional minerals may not be supplied to the clean water. This may be because minerals contained in raw water supplied to the drinking water supply device 1 may remain in the raw water even after the raw water passes through the filter unit.

The amount of minerals in clean water provided to the user may vary depending upon the amount of minerals contained in raw water or the kind of filter. However, the amount of minerals contained in clean water obtained after raw water passes through the filter unit 20 may be very small. Thus, it may be difficult for the user to taste the minerals in the clean water. The amount of minerals contained in the clean water and the amount of minerals contained in the mineral water may differ greatly from each other.

In addition, the amount of minerals contained in the raw water introduced into the drinking water supply device 1 may differ depending upon the flow rate of the raw water, the season, or the region. The amount of minerals contained in clean water or mineral water may have a predetermined range of deviation. That is, the clean water discharged after a predetermined amount of minerals has been filtered by the filter unit 20 of the drinking water supply device 1 may have a predetermined range of deviation in concentration of minerals.

Mineral water generated by the mineral water supply module 100 and then discharged may also have a predetermined range of deviation in concentration of minerals that may be different from the range of deviation in concentration of minerals in the clean water.

A predetermined range of deviation in concentration of minerals in clean water will be referred to as a mineral concentration deviation range R2 of clean water, and a predetermined range of deviation in concentration of minerals in mineral water will be referred to as a mineral concentration deviation range R1 of mineral water for the convenience of description.

The mineral concentration deviation range R1 of the mineral water may be derived based on an allowable deviation in taste of water where the user may taste better tasting water. Alternatively, the mineral concentration deviation range R1 of the mineral water may be a concentration deviation range of minerals contained in mineral water measured after the target amount of minerals to be supplied may be predetermined or set, in order to provide mineral water containing a predetermined amount of minerals, and after a predetermined fixed amount of minerals may be supplied.

In the mineral water supply module 100, the micro channel 200 may be connected to the first channel 71. As minerals are supplied, the mineral concentration deviation range R1 of the mineral water may be easily changed based on the variation in amount of minerals supplied from the micro channel 200. That is, the smaller the diameter of the micro channel 200, the smaller the amount of minerals that may be supplied. It may be possible to accurately control the amount of minerals supplied and to reduce the variation in concentration range of minerals contained in mineral water.

FIG. 5 is a graph that shows a variation in concentration of minerals contained in mineral water and clean water based on the diameter of the micro channel 200 from experiments according to an embodiment. In addition, the graph shows the change in concentration of minerals based on a predetermined number of times when mineral water and clean water may be alternately discharged, a predetermined number of times when clean water may be continuously discharged after mineral water has been discharged, and a predetermined number of times when mineral water may be continuously discharged after clean water has been discharged. In FIG. 5, the micro channel 200 has a diameter of 0.5 mm, 1.0 mm, or 1.5 mm.

The predetermined mineral concentration deviation range R1 of the mineral water may have a range between the upper limit U and the lower limit L based on a target mineral concentration value. The upper limit U and the lower limit L may be ±15% the target mineral concentration.

According to the experimental results, the optimum mineral concentration deviation range R2 of the clean water may be 0 or more, which may be less than the lower limit L of the mineral concentration deviation range R1 of the mineral water.

When the micro channel 200 has a diameter of 0.5 mm, a minimum diameter in consideration of productivity, the distribution of mineral concentration may approximate the target amount of minerals to be supplied. In addition, the mineral concentration may have a small distribution within the mineral concentration deviation range R1 of the mineral water. The concentration of minerals in the clean water may be less than the upper limit of the mineral concentration deviation range R2 of the clean water.

When the micro channel 200 has a diameter of 1.0 mm, an allowable maximum diameter, the concentration of minerals contained the mineral water may be within the mineral concentration deviation range R1 of the mineral water but may approach the upper limit U of the mineral concentration deviation range R1 of the mineral water.

The concentration of minerals contained in the clean water may be less than the upper limit of the mineral concentration deviation range R2 of the clean water, but may more closely approach the upper limit of the mineral concentration deviation range R2 of the clean water than when the micro channel 200 may have a diameter of 0.5 mm.

When the micro channel 200 has a diameter of 1.5 mm, the concentration of minerals contained the mineral water may exceed the upper limit U of the mineral concentration deviation range R1 of the mineral water. The concentration of minerals contained in the clean water may be greater than the upper limit of the mineral concentration deviation range R2 of the clean water. That is, when the micro channel 200 has a diameter of 1.5 mm, the amount of minerals contained in the clean water may be equivalent to the amount of minerals contained in the mineral water. As a result, clean water may taste like mineral water to the user. When the micro channel 200 has a diameter of 1.5 mm, it may be possible to provide mineral water and clean water deviating from the allowable deviation in taste.

Thus, when the micro channel 200 according to the embodiment has a diameter of 0.5 mm to 1.0 mm, it may be possible to supply mineral water and clean water within the allowable deviation in taste of water. In addition, the smaller the diameter of the micro channel 200, the more consistently mineral water that has a desired taste may be supplied.

It may be possible to adjust the amount of minerals discharged by varying the length of the micro channel 200 with a predetermined diameter. The micro channel 200 may have a shape in which the length of the micro channel 200 may be greater than the cross-sectional area of the micro channel 200.

When the micro channel 200 has a predetermined length range, it may be possible to reduce the pressure applied to minerals flowing in the micro channel 200 to thus discharge a predetermined amount of minerals. In addition, it may reduce an effect caused by variation in pressure that may occur due to the operation of the pump 160.

When the micro channel 200 has a length less than the lower limit of the predetermined length range, the reduction in pressure applied to the minerals flowing in the micro channel 200 may be small with the result that a larger amount of minerals than the predetermined amount of minerals may be discharged. When the micro channel 200 is short, the pressure applied to minerals introduced from the second channel 110 may not be sufficiently reduced due to frictional loss. Thus, the amount of the minerals discharged may be greater than the predetermined amount of minerals to be discharged.

When the micro channel 200 is longer than the upper limit of the predetermined length range, the pressure applied to the minerals flowing in the micro channel 200 may be so excessively reduced due to friction that a smaller amount of minerals than the predetermined amount of minerals may be discharged.

To discharge a fixed amount of minerals within an appropriate range, therefore, the micro channel 200 may have a corresponding appropriate length. For example, the micro channel 200 may have a length ranging from 15 mm to 20 mm.

In addition, the pump 160 may be a constant pressure pump that applies a predetermined pressure P. That is, when the pump 160 pressurizes the minerals in the micro channel 200 having the predetermined diameter D and the predetermined length L at the predetermined pressure P, a fixed amount of minerals may be discharged.

According to embodiments disclosed herein, a mineral water supply module 100 may be selected to alternatively provide clean water or mineral water. In the mineral water supply module 100, the second pipe 122 may be located between the first connection pipe 120 and the second valve 130. Even when the second valve 130 is closed, some minerals may remain in the second pipe 122.

For example, after mineral water is discharged, the pipe channel of the micro channel 200 connected to the first pipe 121 may remain filled with minerals. When clean water is selected by the user after mineral water has been discharged, the minerals remaining in the micro channel 200 may move into the clean water introduced from the first channel 71.

To achieve natural equilibrium between materials, movement from high concentration to low concentration may occur. Since there may be a large difference in concentration of minerals between the clean water and the condensed minerals, the condensed minerals may move toward the clean water to achieve natural equilibrium between liquids that have different concentrations.

The larger the diameter of the discharge end 122b of the second pipe 122, which may be connected to the first connection pipe 120, the more this phenomenon may occur. Thus, the micro channel 200 may function not only to discharge a very small fixed amount of minerals as described above but also to minimize the discharge of minerals due to a concentration equilibrium phenomenon when clean water is discharged.

For example, when the micro channel 200 has the minimum diameter D in order to discharge a fixed amount of minerals and has a predetermined length L in order to achieve a sufficient reduction in pressure, it may be possible to minimize the amount of minerals discharged even when clean water may be supplied. Even when clean water is discharged after mineral water has been discharged, it may be possible to supply clean water within the allowable deviation in taste.

Figure 6A:
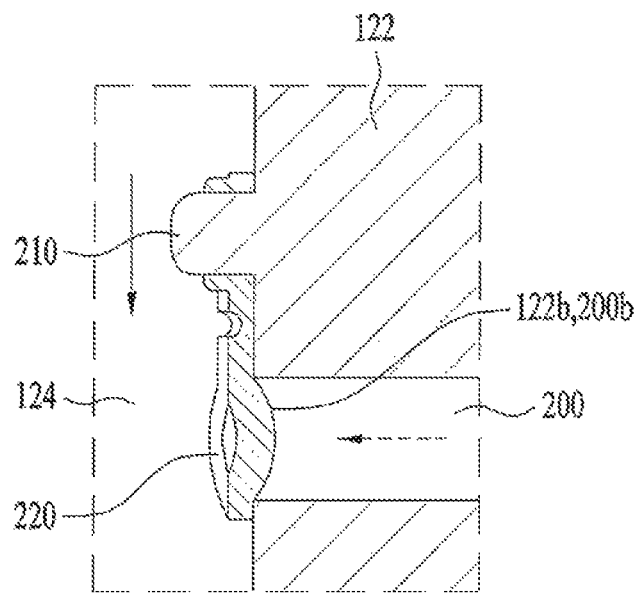
FIG. 6A is a conceptual view of an opening and closing member according to an embodiment.
Figure 6B:
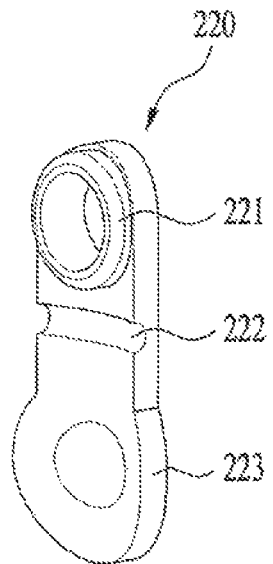
FIG. 6B is a perspective view of FIG. 6A according to an embodiment.

Referring to FIGS. 6A and 6B, the mineral water supply module 100 may further include an opening and closing member 220 configured to selectively open and close the micro channel 200 and to prevent the occurrence of the concentration equilibrium phenomenon when clean water and mineral water are alternately discharged. The opening and closing member 220 may be provided in the discharge end 122b of the second pipe 122. The second pipe 122 may be provided at an end where the discharge end 122b of the second pipe 122 may be formed with a protrusion 210 that fixes the opening and closing member 220.

The opening and closing member 220 may include a fixing part or ring 221 fixed at a side of the protrusion 210 and a deformable part or flap 223 extending a predetermined length in a longitudinal direction of the first channel 71 to close the discharge end 122b of the of the second pipe 122.

The protrusion 210 may be formed at a surface of the discharge end 122b of the second pipe 122 such that the protrusion 210 may protrude a predetermined height. The fixing part 221 may be fixed to the protrusion 210 by force-fitting or welding.

The opening and closing member 220 may further include a deformable groove 222 provided between the fixing part 221 and the deformable part 223 that allows easy deformation of the deformable part 223 and that minimizes the deformation of the fixing part 221.

The thickness of the deformable groove 222 may be less than the thickness of the fixing part 221 or the deformable part 223. The displacement of the deformable groove 222 may increase, and the displacement of the fixing part 221 may decrease due to the pressure from the pump 160. Further, the deformable groove 222 may be prevented from being separated from the protrusion 210 due to excessive deformation of the fixing part 221.

The opening and closing member 220 and the protrusion 210 may protrude into the mixing space 124. The opening and closing member 220 may be parallel to the first pipe 121 and may be perpendicular to the micro channel 200.

When clean water is discharged, the opening and closing member 220 may close the discharge end 122b of the second pipe 122 due to the pressure that discharges the clean water introduced from the first pipe 121 to the mixing space 124 in the first direction.

When mineral water is discharged, the opening and closing member 220 may open the discharge end 122b of the second pipe 122 due to the pressure that discharges the mineral water supplied from the second pipe 122 in the second direction.

The deformable part 223 may deform into the mixing space 124 by a predetermined angle due to the pressure in which the pump 160 may pressurize minerals discharged through the discharge end 122b of the second pipe 122 with the result that the discharge end 122b of the second pipe 122 may be opened. That is, when the pressure from the pump 160 is a predetermined level or higher, the opening and closing member 220 may open the micro channel unit 200.

The opening and closing member 220 may be made of a soft synthetic resin or a rubber material so the opening and closing member 220 may be easily deformed when pressure is applied. For example, the opening and closing member 220 may be made of, e.g., urethane, ethylene propylene diene monomer rubber (EPDM), or nitrile butadiene rubber (NBR).

The first connection pipe 120 may be configured to have a structure in which the first pipe 121 may be connected to the extremity 200b of the micro channel unit 200 and the protrusion 210 and the opening and closing member 220 may protrude into the mixing space 124. However, it may be difficult to manufacture the first connection pipe 120.

Figures 7A, 7B:
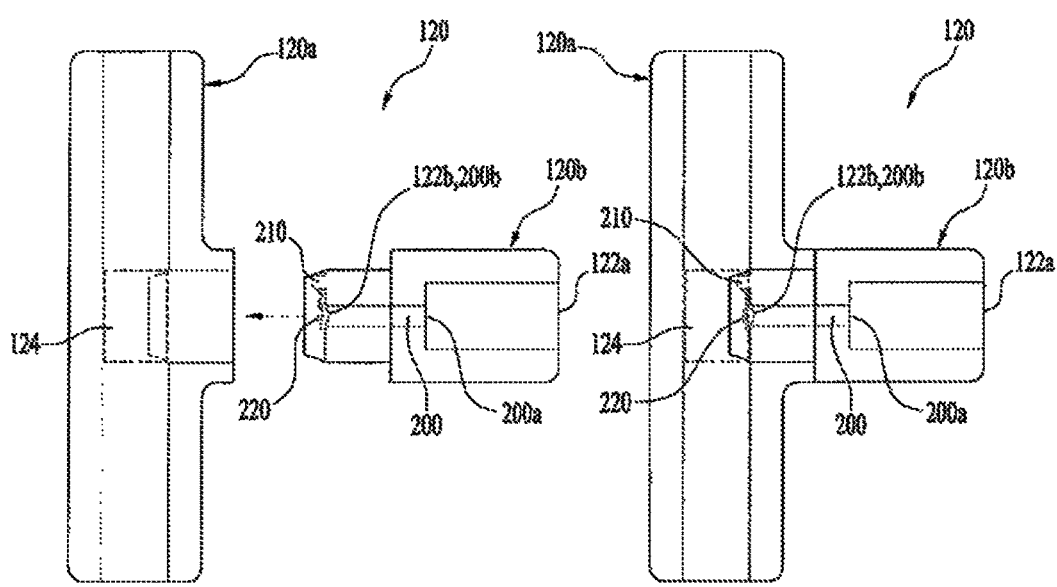
FIGS. 7A and 7B are assembly views showing a mineral water generation unit according to an embodiment.

Referring to FIGS. 7A and 7B, a first connection pipe 120 according to an embodiment may include a first body 120a that forms the first pipe 121 and the third pipe 123 and a second body 120b that forms the second pipe 122. The first body 120a and the second body 120b may be coupled to each other. The first connection pipe 120 according to the embodiment may be easier to manufacture.

The first body 120a may be configured such that the first pipe 121 and the third pipe 123 may be linearly connected. The first body 120a may include a protrusion that protrudes out a predetermined height between the first pipe 121 and the third pipe 123. The first body 120a may be in a T shape where a second direction pipe may be formed at a side of a first direction pipe channel such that the second direction pipe may be perpendicular to the first direction pipe channel.

The first connection pipe 120 may include a second body 120b that forms the second pipe 122. The second body 120b may be inserted into the protrusion of the first body 120a. The second body 120b may be provided with an introduction end 122a and a micro channel 200 into which minerals may be supplied from the second channel 110. In addition, the second body 120b may be provided with a protrusion 210 and an opening and closing member 220 formed on the side of the discharge end 200b of the micro channel 200.

A first side of the second body 120b connected to the second channel 110 may extend a predetermined length and may have the same outer diameter and inner diameter as the second channel 110. The micro channel 200 may be provided at a second side of the second body 120b. That is, the second body 120b may be configured such that the inner diameter of the second body 120b may be reduced in a direction that minerals flow.

The second body 120b may be provided with a step part having an outer diameter corresponding to the inner diameter of the protrusion such that the step part may be inserted into the pipe channel of the protrusion of the first body 120a.

The first body 120a and the second body 120b may be coupled to each other by inserting the step part into the pipe channel of the protrusion. In addition, the outer circumferential surfaces of the protrusion of the first body 120a and the step part of the second body 120b that contact may be welded to connect the first body 120a and the second body 120b and to prevent water leakage.

That is, the second body 120b, in which the micro channel 200, the protrusion 210, and the opening and closing member 220 have been previously formed, may be inserted into the first body 120a, and the second body 120b may be fixed to the first body 120a. Thus, the first connection pipe 120 may be more easily configured. In addition, the structure of the first connection pipe 120 may be simplified, productivity may be improved, and manufacturing costs may be reduced.

FIGS. 8 and 9 show a first connection pipe according to another embodiment. Referring to FIGS. 8A and 8B, a first connection pipe 120' according to another embodiment may include a first pipe 121 connected to the first channel 71, a second pipe 122' connected to the second channel 110, and a third pipe 123 connected to the water discharge channel 72. A mixing space 124 where minerals may be mixed with clean water may be formed between the first pipe 121 and the second pipe 122'.

The second pipe 122' may be configured such that the inner diameter of the second pipe 122' may increase to adjust the amount of minerals that are discharged in a direction in which the minerals flow. That is, the second pipe 122' may be provided with a micro channel 200 at an introduction end 122a' connected to the second channel 110.

For example, an introduction end 200a of the micro channel 200 may be formed at the introduction end 122a' of the second pipe 122', and the micro channel 200 may extend a predetermined length. In addition, a protrusion 210 and an opening and closing member 220 may be provided at a discharge end 200b of the micro channel 200.

The micro channel 200, the protrusion 210, and the opening and closing member 220 were described when describing the first connection pipe according to the previous embodiment of the present application, and therefore a further detailed description thereof will be omitted.

The second pipe 122' may be connected to the mixing space 124 where the inner diameter of the second pipe 122' may increase at the discharge end 200b of the micro channel 200. A mineral storage space where minerals discharged from the micro channel 200 may be introduced and temporarily stored may be formed between the discharge end 200b of the micro channel 200 and the mixing space 124.

The minerals discharged from the micro channel 200 into the mineral storage space may move to the mixing space 124 according to a diffusion phenomenon that moves toward equilibrium in concentration between the minerals and the clean water introduced from the first pipe 121. In addition, clean water may be introduced into the mineral storage space so the minerals may be preliminarily mixed with the clean water.

Figures 9A, 9B:
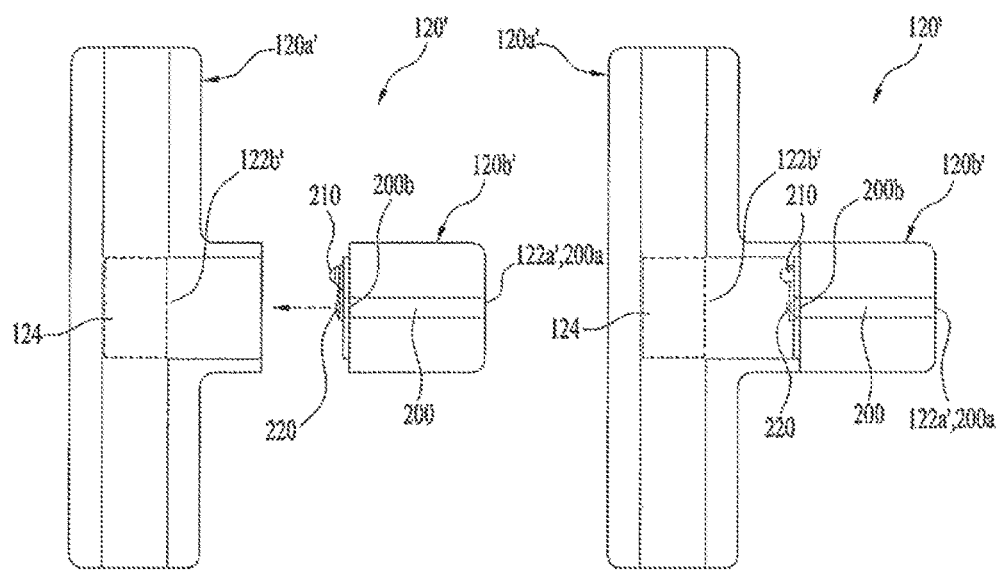
FIGS. 9A and 9B are assembly views showing a mineral water generation unit according to another embodiment.

Referring to FIGS. 9A and 9B, a first connection pipe 120' according to another embodiment may include a first body 120a' that integrally forms the first pipe 121 and the third pipe 123 and a second body 120b' that forms the second pipe 122. The first body 120a' and the second body 120b' may be coupled to each other.

The first body 120a' may be configured such that the first pipe 121 and the third pipe 123 may be linearly connected. The first body 120a' may include a protrusion that protrudes out at a predetermined height between the first pipe 121 and the third pipe 123.

The protrusion may be provided with a mineral storage space that may have a cross-sectional area greater than the cross-sectional area of a micro channel 200 in a direction in which minerals flow.

The first body 120a' may be formed in a T shape where a second direction pipe may be formed at a side of a first direction pipe channel such that the second direction pipe may be perpendicular to the first direction pipe channel.

The first connection pipe 120' may include a second body 120b' that forms the second pipe 122. The second body 120b' may be coupled to the protrusion of the first body 120a'. The second body 120b' may be provided with a micro channel 200, into which minerals may be supplied from the second channel 110. In addition, the second body 120b' may be provided with a protrusion 210 and an opening and closing member 220 formed on the side of a discharge end 200b of the micro channel 200.

A side of the second body 120b' that the discharge end 200b of the micro channel 200 may be formed may be directly connected to the protrusion of the first body 120a'. In addition, the outer circumferential surfaces of the first body 120a' and the second body 120b' that contact may be welded so as to connect the first body 120a' and the second body 120b' and to prevent water leakage.

That is, the second body 120b' may not include a connection structure configured to be inserted into a pipe channel of the protrusion, and only the micro channel 200, the protrusion 210, and the opening and closing member 220 may be formed in the second body 120b'. Thus, the structure of the second body 120b' may be further simplified.

A drinking water supply device 1 according to an embodiment may further include a controller 300 to control the first valve 74, the second valve 130, the pump 160, the pressure sensor 170, and the drainage valve 1230. The controller 300 may be electrically connected to the first valve 74, the second valve 130, the pump 160, the pressure sensor 170, and the drainage valve 1230. While the second valve 130 is closed, the controller 300 may selectively control the pump 160 so the pressure in the second channel 110 may be maintained within a predetermined range of pressure.

Figure 10:
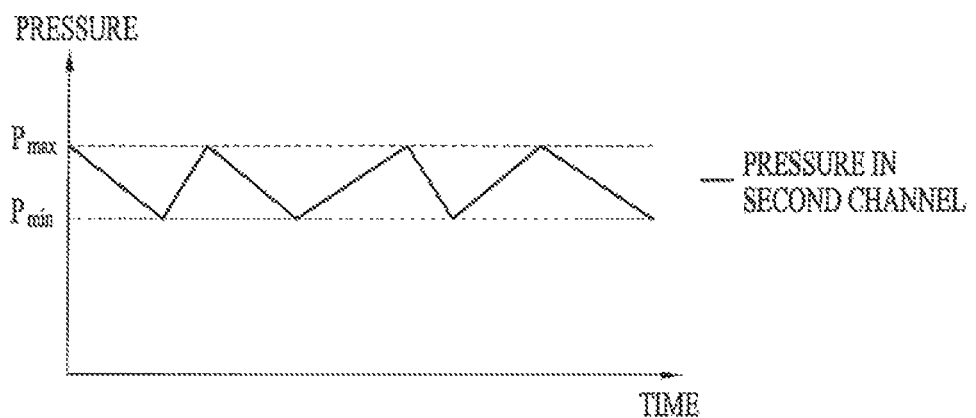
FIG. 10 is a graph showing control of pressure in a mineral supply line.

As shown in FIG. 10, the controller 300 may selectively control the pump 160 so the pressure in the second channel 110 may be maintained between a predetermined upper limit pressure value $P_{max}$ and a predetermined lower limit pressure value $P_{min}$. The pressure in the second channel 110 may be reduced over time.

The controller 300 may control the pump 160 to repeatedly operate and stop based on the pressure in the second channel 110 sensed by the pressure sensor 170 so the pressure in the second channel 110 may be within a predetermined range of pressure or between the upper limit pressure value $P_{max}$ and the lower limit pressure value $P_{min}$. This is because the pressure in the second channel 110 may be gradually reduced over time.

In order to add a fixed amount of condensed minerals to drinking water according to a signal to discharge the drinking water, it may be necessary to control the pressure in the second channel 110 in real time so the pressure in the second channel 110 may be maintained within the predetermined range of pressure.

For example, the controller 300 may control the mineral supply valve 130 to open for a predetermined first time T1 and then close according to a water discharge signal. The water discharge signal may be based on a quantitative control mode to discharge a predetermined amount of drinking water.

When the second valve 130 is opened and closed in order to supply condensed minerals to drinking water, the pressure in the second channel 110 may be lower than the predetermined range of pressure $P_{min}$ to $P_{max}$.

After the second valve 130 is opened for the first time T1 and then closed, the controller 300 may control the pump 160 to selectively operate based on the value of the pressure sensed by the pressure sensor 170 provided in the second channel 110.

When the second valve 130 is closed, the pressure in the second channel 110 may be maintained within the predetermined range of pressure $P_{min}$ to $P_{max}$ according to selective operation of the pump 160. When the second valve 130 is open for the first time T1, a predetermined amount of condensed minerals may be supplied to drinking water through the first connection pipe 120.

The predetermined range of pressure $P_{min}$ to $P_{max}$ in the second channel 110 and the first time T1 during which the second valve 130 is open may be values determined through experimentation based on the amount of drinking water to be discharged.

That is the predetermined range of pressure $P_{min}$ to $P_{max}$ and the first time T1 may be prestored in a storage device, for example, a memory, based on the amount of condensed minerals that are added according to the amount of drinking water obtained through experimentation.

As the pressure in the second channel or the mineral supply line 110 may be sensed by the pressure sensor 170 provided at a specific point in the second channel 110, the average pressure of the entire second channel 110 with a predetermined length may not be obtained.

As the second channel 110 may communicate with the interior of the mineral container 140, the pressure in the second channel 110 in the longitudinal direction may not be equal to the pressure in the mineral container 140 immediately after condensed minerals may be discharged through the second channel 110.

That is, the pressure may be distributed between the second channel 110 and the mineral container 140 in the longitudinal direction of the second channel 110 that has a predetermined length. An error may occur in sensing the pressure using the pressure sensor 170 due to such distribution of pressure.

Thus, the controller 300 may be configured to read the value of the pressure sensed by the pressure sensor 170 at a predetermined second time T2 after a closing of the second valve 130 may be sensed.

Alternatively, the controller 300 may control the pressure sensor 170 to sense the pressure in the second channel 110 at the predetermined second time T2 after a closing of the second valve 130 may be sensed. The second time T2 may range from 1 to 5 seconds. The second time T2 may be set by experimentation.

When the pressure in the second channel 110 is reduced after the second valve 130 is opened and closed in order to supply condensed minerals, it may be possible to accurately sense an initial value of the pressure in the second channel 110 in order to increase the pressure in the second channel 110 within the predetermined range of pressure $P_{min}$ to $P_{max}$.

The pressure in the second channel 110 which may be lower than the predetermined range of pressure $P_{min}$ to $P_{max}$ may be increased and maintained within the predetermined range of pressure $P_{min}$ to $P_{max}$ through the operation of the pump 160.

When the pressure in the second channel 110 is increased through the operation of the pump 160, however, the pressure in the second channel 110 may exceed the predetermined pressure due to various causes, e.g., pump operation time, compression load, and the distance between a portion where the pressure may be sensed and the pump 160 or a portion at which the pressure sensor 170 may be mounted.

When the pressure in the second channel 110 sensed by the pressure sensor 170 is lower than the predetermined range of pressure, therefore, the controller 300 may control the pump 160 to periodically operate a plurality of times. That is, when the pressure in the second channel 110 is lower than the predetermined range of pressure, the pressure in the second channel 110 may exceed the predetermined range of pressure if the pump 160 is continuously operated to increase the pressure in the second channel 110 within the predetermined range of pressure.

Thus, the pump 160 may be periodically may operate a plurality of times, and the pressure in the second channel 110 may be sensed by the pressure sensor 170. When the pressure in the second channel 110 remains lower than the predetermined range of pressure, the pump 160 may periodically operate a plurality of times. In other words, when the pressure in the second channel 110 is lower than the predetermined range of pressure, it may be possible to increase the pressure in the second channel 110 in stages by periodically operating the pump 160 a plurality of times.

The number of times the pump 160 operates and the period in which the pump 160 operate may be values determined through experimentation based on the difference between the pressure in the second channel 110 and the predetermined range of pressure and may be prestored in a storage device, for example, a memory that may be connected to the controller 300.

The difference between the pressure in the second channel 110 and the predetermined range of pressure may indicate how much the pressure in the second channel 110 may be greater than the predetermined upper limit pressure value $P_{max}$ or how much the pressure in the second channel 110 may be lower than the predetermined lower limit pressure value $P_{min}$.

It may be possible to accurately control the operation of the pump 160 so the pressure in the second channel 110 may be increased and maintained within the predetermined range of pressure without exceeding the predetermined range of pressure by periodically operating the pump 160 a plurality of times instead of continuously operating the pump 160

When the mineral container 140 is replaced, minerals remaining in the mineral container 140 may flow to the outside if the minerals are not discharged in advance. In addition, when the pressure in the second channel 110 is higher than the predetermined range of pressure, a larger amount of condensed minerals than a predetermined amount of condensed minerals may be added to drinking water, and the mineral water may have a different taste than a predetermined taste. Thus, it may not be possible to reduce the pressure in the mineral supply line through the control of the pump 160.

The drainage valve 1230 provided in the drainage module 1200, may be configured to open in order to discharge condensed minerals remaining in the mineral container 140 when the mineral container 140 is replaced.

When replacing the mineral container 140, the user may open the drainage valve 1230 to discharge condensed minerals remaining in the mineral container 140, may separate the mineral container 140 that has been used from the container fastener 150, and may fasten a new mineral container 140 to the container fastener 150. The drainage valve 1230 may be a solenoid valve that may be controlled by the controller so the drainage valve 1230 is opened according to an external signal to replace the mineral container 140.

In addition, the drainage valve 1230 may be controlled by the controller 300 so that the drainage valve 1230 may open for a predetermined third time T3 when the pressure sensed by the pressure sensor 170 may be higher than the predetermined range of pressure $P_{min}$ to $P_{max}$ in a state in which the second valve or the mineral supply valve 130 is closed.

The third time T3 may be decided based on the difference between the pressure in the second channel 110 and the predetermined range of pressure $P_{min}$ to $P_{max}$ and may be a value determined through experimentation. In addition, the value determined through experimentation may be stored in a storage device, e.g., a memory that may be connected to the controller 300.

The controller 300 may control the drainage valve 1230 and the pressure sensor 170 so the pressure in the second channel 110 may be sensed by the pressure sensor 170 after the drainage valve 1230 is opened for the third time T3 and then closed.

When the pressure in the second channel 110 is higher than the predetermined range of pressure $P_{min}$ to $P_{max}$ even after at least some of the condensed minerals in the second channel 110 may be discharged through the drainage valve 1230, the controller 300 may control the drainage valve 1230 to open for the third time T3 based on the difference between the pressure in the second channel 110 and the predetermined range of pressure $P_{min}$ to $P_{max}$.

Furthermore, when it may become necessary to wash the second channel 110 and the drainage channel 1220, the drainage valve 1230 may be opened so wash water may flow to wash the second channel 110 and the drainage channel 1220.

Figure 11:
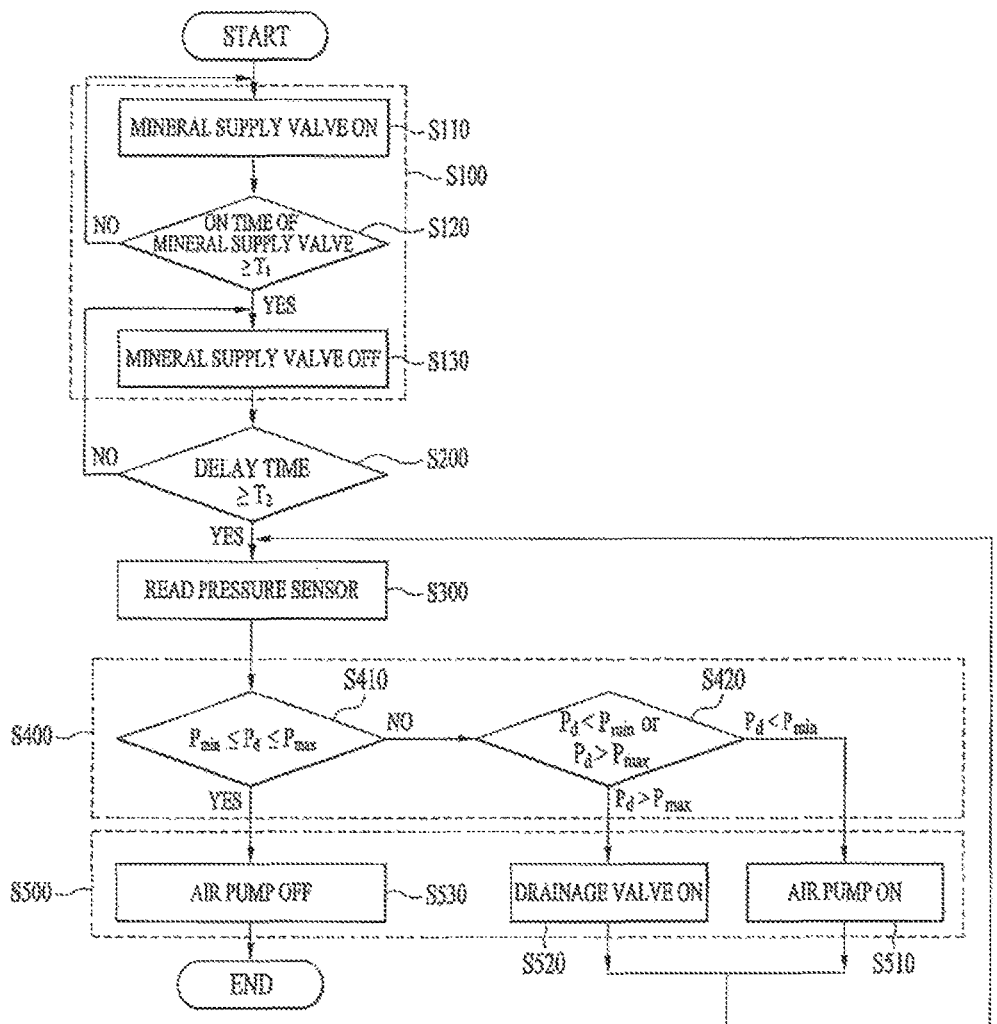
FIG. 11 is a flowchart showing a method of controlling a drinking water supply device according to an embodiment.

FIG. 11 is a flowchart of a method of controlling a drinking water supply device according to an embodiment. FIGS. 1 to 3 may be equally applicable to the method of controlling the drinking water supply device.

Referring to FIG. 11 together with FIG. 1, a method of controlling the drinking water supply device according to the embodiment may be a method of controlling a drinking water supply device including a first channel 71 configured to conduct water, a second channel 110 configured to supply minerals to the first channel 71 with a pressure sensor 170 and a mineral supply valve 130, a mineral container 140 connected to the second channel 110, an air pump 160 configured to pressurize an interior of the mineral container 140, and a controller configured to control the mineral supply valve 130 and the air pump 160.

The method of controlling the drinking water supply device may include a water discharge step S100 of opening and closing the mineral supply valve 130, a delay time determination step S200 of determining a delay time after the mineral supply valve 130 is closed, a pressure sensing step S300 of sensing the pressure in the second channel 110 after the delay time passes, a pressure value comparison step S400 of comparing the pressure value sensed at the pressure sensing step with a predetermined range of pressure $P_{min}$ to $P_{max}$, and a selective pump operation step S500 of selectively operating the air pump 160 based on the result of comparison at the pressure value comparison step.

At the water discharge step S100, the mineral supply valve 130 may be opened for a predetermined first time T1 and then closed while drinking water flows through the second channel 110. That is, at the water discharge step S100, the mineral supply valve 130 may be opened for the predetermined first time T1 and then closed so a predetermined amount of condensed minerals may be supplied to the drinking water.

For example, the water discharge step S100 may include a step S110 of opening or turning on the mineral supply valve 130, a step S120 of the controller 300 determining whether the first time T1 has elapsed after opening or turning on of the mineral supply valve 130, and a step S130 of closing or turning off the mineral supply valve 130 when the first time T1 passes.

At the delay time determination step S200, the controller 300 may determine whether a predetermined second time T2 has passed after closing of the mineral supply valve 130. The second time T2 may range from 1 to 5 seconds. The second time T2 may be differently predetermined or set by experimentation.

At the pressure sensing step S300, the pressure in the second channel 110 may be sensed by the pressure sensor 170 after the second time T2 passes. For example, at the pressure sensing step S300, the pressure in the second channel 110 may be sensed by the pressure sensor 170 after the second time T2 passes, and the sensed pressure value may be transmitted to the controller 300. Alternatively, the pressure in the second channel 110 may be sensed by the pressure sensor 170 in real time, and the controller 300 may read the pressure value sensed by the pressure sensor 170 after the second time T2 passes.

The pressure sensing step S300 may be carried out after the delay time determination step S200 because, when the pressure is sensed without a delay after the mineral supply valve 130 is opened and closed, it may not be possible to accurately measure the pressure in the second channel 110 due to the distribution of pressure in the second channel 110.

At the pressure value comparison step S400, the controller 300 may compare the pressure value $P_d$ sensed at the pressure sensing step with the predetermined range of pressure $P_{min}$ to $P_{max}$. That is, at the pressure value comparison step S400, the controller 300 may determine whether the sensed pressure value $P_d$ may be within the predetermined range of pressure $P_{min}$ to $P_{max}$ or may deviate from the predetermined range of pressure $P_{min}$ to $P_{max}$.

For example, the pressure value comparison step S400 may include a step S410 of determining whether the sensed pressure value $P_d$ may be within the predetermined range of pressure $P_{min}$ to $P_{max}$ and a step S420 of determining whether the sensed pressure value $P_d$ may deviate from the predetermined range of pressure $P_{min}$ to $P_{max}$.

At the step S420 of determining whether the sensed pressure value $P_d$ may deviate from the predetermined range of pressure $P_{min}$ to $P_{max}$, the controller 300 may determine whether and how much the sensed pressure value $P_d$ may be lower than the predetermined lower limit pressure value $P_{min}$ and whether and how much the sensed pressure value $P_d$ may be higher than the predetermined upper limit pressure value $P_{max}$.

At the selective pump operation step S500, the controller 300 may control the air pump 160 to selectively operate based on the result at the pressure value comparison step. For example, the selective pump operation step (500 may include a pump operation step S510 of operating the air pump 160 when it is determined at the pressure value comparison step S400 that the pressure value $P_d$ sensed by the pressure sensor 170 may be less than the predetermined range of pressure $P_{min}$ to $P_{max}$.

That is, when the sensed pressure value $P_d$ is less than the predetermined range of pressure $P_{min}$ to $P_{max}$, the air pump 160 may be operated so the pressure in the second channel 110 may be within the predetermined range of pressure $P_{min}$ to $P_{max}$.

At the pump operation step S510, the air pump 160 may be periodically operated a plurality of times. At the pump operation step S510, the air pump 160 may be periodically operated and stopped a plurality of times until the pressure value $P_d$ sensed by the pressure sensor 170 may be within the predetermined range of pressure $P_{min}$ to $P_{max}$. That is, the controller 300 may control the air pump 160 to periodically operate and stop a plurality of times.

Thus, it may be possible to accurately control the operation of the air pump 160 so the pressure in the second channel 110 may be prevented from exceeding the predetermined range of pressure $P_{min}$ to $P_{max}$ and the pressure in the second channel 110 may be within the predetermined range of pressure $P_{min}$ to $P_{max}$.

The pressure sensing step S300 and the pressure value comparison step S400 may be carried out again after the air pump 160 is periodically operated and stopped a plurality of times.

The selective pump operation step S500) may include a mineral discharge step S520) of discharging some of the condensed minerals in the second channel 110 to the outside so the pressure value $P_d$ in the second channel 110 may be within the predetermined range of pressure $P_{min}$ to $P_{max}$ when it is determined at the pressure value comparison step S400 that the pressure value $P_d$ sensed by the pressure sensor 170 may be greater than the predetermined range of pressure $P_{min}$ to $P_{max}$.

When the sensed pressure value $P_d$ is greater than the predetermined range of pressure $P_{min}$ to $P_{max}$, additional components for reducing the pressure may be needed in order to reduce the pressure in the second channel 110 so the pressure in the second channel 110 may be within the predetermined range of pressure $P_{min}$ to $P_{max}$.

At the mineral discharge step S520, some of the condensed minerals in the second channel 110 may be discharged to the outside. Thus, the pressure in the second channel 110 may be reduced. When the sensed pressure value $P_d$ is greater than the predetermined range of pressure $P_{min}$ to $P_{max}$, some of the condensed minerals in the second channel 110 may be discharged to the outside so the pressure in the second channel 110 may be within the predetermined range of pressure $P_{min}$ to $P_{max}$.

The amount of the condensed minerals discharged to the outside at the mineral discharge step S520 may be a value determined through experimentation based on the difference between the sensed pressure value $P_d$ and the predetermined range of pressure $P_{min}$ to $P_{max}$, and may be stored in a storage device, e.g., a memory, that may be connected to the controller 300.

Since the condensed minerals may be discharged in order to reduce the pressure in the second channel 110, the operation of the air pump 160 may be stopped at the mineral discharge step S520.

The selective pump operation step S500 may include an air pump OFF step S530 to turn off and keep off the air pump 160 when it is determined at the pressure value comparison step S400 that the pressure value $P_d$ sensed by the pressure sensor 170 may be within the predetermined range of pressure $P_{min}$ to $P_{max}$.

This is because, when the sensed pressure value $P_d$ is within the predetermined range of pressure $P_{min}$ to $P_{max}$, it may be possible to satisfy a condition for supplying a predetermined amount of condensed minerals to drinking water by adjusting the opening time of the mineral supply valve 130.

Even when it may be determined at the pressure value comparison step S400 that the pressure value $P_d$ sensed by the pressure sensor 170 may be within the predetermined range of pressure $P_{min}$ to $P_{max}$, and therefore the air pump 160 remains OFF, the pressure in the second channel 110 may be continuously sensed by the pressure sensor 170 in real time.

The controller 300 may control the air pump 160 to selectively operate based on the sensed pressure value so the pressure in the second channel 110 may be maintained within the predetermined range of pressure $P_{min}$ to $P_{max}$.

It may be possible to provide a drinking water supply device capable of preventing a sensing error due to the distribution of the pressure in a mineral supply line when the pressure in the mineral supply line is sensed using a pressure sensor and a method of controlling the same.

In addition, it may be possible to provide a drinking water supply device capable of increasing the pressure in a mineral supply line within a predetermined range of pressure so the pressure in the mineral supply line does not exceed the predetermined range of pressure and a method of controlling the same.

According to an embodiment, a drinking water supply device may be provided capable of efficiently reducing the pressure in a mineral supply line when the pressure in the mineral supply line is higher than a predetermined range of pressure and a method of controlling the same.

A drinking water supply device may be provided capable of discharging minerals remaining in a mineral container in advance at the time of replacing the mineral container and a method of controlling the same.

According to an embodiment, a mineral water supply module may provide mineral water containing minerals within a predetermined range of concentration.

A mineral water supply module may prevent the diffusion of minerals remaining in a mineral supply pipe when clean water is discharged and thus provide clean water within an allowable deviation in taste of water.

A mineral water supply module may alternately provide mineral water and clean water having a regular taste within an allowable deviation in taste of water.

A mineral water supply module may accelerate the mixing of minerals with clean water and thus provide mineral water having a uniform taste when the mineral water is discharged.

A mineral water supply module may provide a mineral water supply module that has a simple structure and may be easily manufactured.

In addition, according to an embodiment, a mineral water supply module may have a compact structure that is easily applicable to various drinking water supply devices.

According to an embodiment disclosed herein, a drinking water supply device may be capable of preventing the occurrence of a sensing error due to the distribution of the pressure in a mineral supply line when the pressure in the mineral supply line is sensed using a pressure sensor, and a method of controlling the drinking water supply device capable of the same may be provided.

A drinking water supply device may be capable of increasing the pressure in a mineral supply line within a predetermined range of pressure such that the pressure in the mineral supply line does not exceed the predetermined range of, and a method of controlling the drinking water supply device capable of the same may be provided.

A drinking water supply device may be capable of efficiently reducing the pressure in a mineral supply line when the pressure in the mineral supply line is higher than a predetermined range of pressure, and a method of controlling the drinking water supply device capable of the same may be provided.

A drinking water supply device may be capable of discharging minerals remaining in a mineral container in advance at the time of replacing the mineral container, and a method of controlling the drinking water supply device capable of the same may be provided.

In addition, drinking water supply device may be capable of providing mineral water in which the deviation in concentration of minerals may be minimized or clean water having a taste that may fall within an allowable deviation and a drinking water supply device including the same may be provided.

According to embodiments disclosed herein, a drinking water supply device may include a first channel configured to channel water, a water discharge pipe coupled to the rear end of the first channel, a first connection pipe connecting the first channel and the water discharge pipe, a second channel configured to supply minerals to the first connection pipe, the second channel having a pressure sensor and a mineral supply valve provided therein, a mineral container configured to communicate with the first connection pipe via the second channel and configured to store condensed minerals, a pump configured to pressurize the interior of the mineral container to allow discharge of the condensed minerals from the mineral container, and a controller that controls the mineral supply valve to open for a first predetermined time and then close according to a water discharge signal. Further, the controller may control the pump to selectively operate based on a prescribed pressure value sensed by the pressure sensor after the mineral supply valve is open for the first time and then closed.

The controller may be configured to read the pressure value in the second channel sensed by the pressure sensor a predetermined second time after closing of the mineral supply valve is sensed.

When the pressure value sensed by the pressure sensor is lower than a predetermined pressure value, the controller may control the pump to periodically operate a plurality of times.

The first connection pipe may be provided with a second pipe for reducing a supply pressure of condensed minerals that are supplied through the second channel.

The pressure sensor may be provided further upstream of the second channel than the mineral supply valve.

The pump may be an air pump configured to suction external air and to inject the suctioned external air into the mineral container.

The mineral container may be provided at a lower part thereof with an injection hole, through which external air is injected into the mineral container, and a discharge hole, through which the condensed minerals are discharged from the mineral container.

The drinking water supply device may further include a container fastener configured to fasten to the mineral container at a lower side of the mineral container, wherein the injection hole and the discharge hole may be formed at a lower end of the container fastener, the injection hole may be connected to the air pump via a third channel, and the discharge hole may be connected to the second channel.

The drinking water supply device may further include a second connection pipe provided between the second channel and the container fastener, and a drainage channel connected to the second connection pipe, the drainage channel having a drainage valve provided therein.

The drainage valve may be controlled by the controller such that the drainage valve is open in order to discharge condensed minerals remaining in the mineral container at the time of replacing the mineral container. In addition, the drainage valve may be controlled by the controller such that the drainage valve is open for a predetermined third time when the pressure value sensed by the pressure sensor is higher than the predetermined range of pressure in a state in which the mineral supply valve is closed.

A method of controlling a drinking water supply device, including a first channel configured to channel water, the first channel provided with a flow rate sensor, a second channel configured to supply minerals to the first channel, the second channel provided with a pressure sensor and a mineral supply valve, a mineral container connecting to the second channel, an air pump configured to pressurize an interior of the mineral container, and a controller configured to control the mineral supply valve and the air pump may be provided. The method of controlling the drinking water supply device may include opening the water supply valve for a first predetermined time and then closing the water supply valve while drinking water flows through the second channel, determining whether a second predetermined time may have elapsed after closing of the water supply valve, sensing a pressure value in the second channel using the pressure sensor after the second predetermined time passes, comparing the pressure value sensed with a predetermined range of pressure, and selectively operating the air pump based on a result from the comparing of the pressure value sensed with the predetermined range of pressure.

Selectively operating the air pump may include operating the air pump when it may be determined from the comparing of the pressure value sensed with the predetermined range of pressure that the pressure value sensed by the pressure sensor may be less than the predetermined range of pressure.

At the operating of the air pump, the air pump may be periodically operated a plurality of times.

At the operating of the air pump, the air pump may be periodically operated and stopped a plurality of times until the pressure value sensed by the pressure sensor may be within the predetermined range of pressure.

Selectively operating the air pump may include discharging some condensed minerals in the second channel to an outside such that the pressure value in the second channel may be within the predetermined range of pressure when it may be determined from comparing the pressure value sensed with a predetermined range of pressure that the pressure value sensed by the pressure sensor may be greater than the predetermined range of pressure.

At the discharging of some condensed minerals, the operation of the air pump may be stopped.

A mineral water supply module for providing mineral water to a user may include a first channel for supplying clean water, a second channel for supplying minerals, and a water discharge channel for discharging clean water or clean water containing minerals, i.e. mineral water, depending upon whether minerals are supplied.

The mineral water supply module may further include a first connection pipe, which includes a first pipe connected to the first channel, a second pipe connected to the second channel, and a third pipe connected to the water discharge channel. A mixing space, in which minerals are mixed with clean water, may be formed between the first pipe and the second pipe.

The mineral water supply module may further include a micro channel provided in the second pipe in order to provide mineral water, in which the deviation in concentration of minerals is minimized, the micro channel defining a mineral supply line, through which a very small amount of minerals are supplied to the mixing space.

The micro channel may be configured to have a minimum diameter and a predetermined length at which the micro channel may be molded and machined such that the micro channel supplies a predetermined fixed amount of minerals for a predetermined time.

The mixing space may be a space in which clean water flowing in the first pipe in a first direction and minerals flowing in the second pipe in a second direction, which is different from the first direction, collide with each other such that the minerals are mixed with the clean water.

The mineral water supply module may further include an opening and closing member for selectively opening and closing the micro channel.

The opening and closing member, which is a means for fundamentally preventing the diffusion of minerals remaining in the micro channel according to concentration equilibrium when clean water is selected by a user, may be provided at the discharge end of the micro channel, through which minerals are supplied to the mixing space.

The second pipe may be provided at an end thereof, at which the discharge end of the micro channel is formed, with a protrusion for fixing the opening and closing member.

The opening and closing member may include a fixing part fixed to the protrusion, a deformable part extending from the fixing part to the discharge end of the micro channel by a predetermined length, and a deformable groove provided between the fixing part and the deformable part for allowing easy deformation of the deformable part while minimizing the deformation of the fixing part.

The opening and closing member may be made of a soft synthetic resin or a rubber material such that the opening and closing member is opened when the pressure applied by the pump is equal to or greater than a predetermined level and such that the opening and closing member is easily deformable when pressure is applied thereto.

In order to improve productivity, the first connection pipe may include a first body, which integrally forms the first pipe and the third pipe, and a second body, which forms the second pipe. The first body and the second body may be coupled to each other.

The first body may include a protrusion diverging perpendicularly between the first pipe and the third pipe such that the protrusion protrudes a predetermined height.

The second body may be provided at the other side thereof, at which the micro channel is provided, with a step part having an outer diameter corresponding to the inner diameter of the protrusion. The second body may be coupled to the first body by inserting the step part into the pipe channel of the protrusion and welding the step part to the pipe channel of the protrusion.

One side of the second body, at which the discharge end of the micro channel is formed, may be directly connected to the outer circumferential surface of the protrusion, and the outer circumferential surface of the second body may be welded to the outer circumferential surface of the protrusion such that the second body is coupled to the first body.

A mineral water generation module may include a first channel for supplying clean water, a second channel for supplying minerals, and a water discharge channel for discharging clean water or clean water containing minerals, i.e. mineral water, depending upon whether minerals are supplied.

The mineral water generation module may further include a first connection pipe, which includes a first pipe connected to the first channel, a second pipe connected to the second channel, and a third pipe connected to the water discharge channel. A mixing space, in which minerals are mixed with clean water, may be formed between the first pipe and the second pipe.

The mineral water generation module may further include a micro channel provided in the second pipe for selectively discharging clean water or mineral water. The micro channel may be formed in a cylindrical shape having a diameter of 0.5 mm to 1.0 mm such that a predetermined very small amount of minerals are supplied to the mixing space through the micro channel.

This application relates to U.S. application Ser. Nos. 14/963,353 and 14/963,418, both filed on Dec. 9, 2015, which are hereby incorporated by reference in their entirety. Further, one of ordinary skill in the art will recognize that features disclosed in these above-noted applications may be combined in any combination with features disclosed herein.

Any reference in this specification to "one embodiment," "an embodiment," "example embodiment," etc., means that a particular feature, structure, or characteristic described in connection with the embodiment is included in at least one embodiment of the application. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A drinking water supply device comprising:
   a first channel configured to channel water;
   a water discharge channel coupled downstream of the first channel;
   a first connection pipe connecting the first channel and the water discharge channel;
   a second channel configured to supply minerals to the first connection pipe, the second channel provided with a pressure sensor and a mineral supply valve;
   a mineral container configured to communicate with the first connection pipe via the second channel and configured to store condensed minerals;
   a pump configured to pressurize an interior of the mineral container to allow discharge of the condensed minerals from the mineral container; and
   a controller configured to control the mineral supply valve to open for a first predetermined time and then to close according to a water discharge signal,
   wherein the controller controls the pump to selectively operate based on a prescribed pressure value sensed by the pressure sensor after the mineral supply valve is opened for the first predetermined time and then closed.

2. The drinking water supply device according to claim 1, wherein the controller is configured to read the pressure value sensed by the pressure sensor in the second channel at a second predetermined time after the pressure sensor senses the mineral supply valve is closing.

3. The drinking water supply device according to claim 2, wherein the controller controls the pump to periodically operate a plurality of times when the pressure value sensed by the pressure sensor is lower than a predetermined pressure value.

4. The drinking water supply device according to claim 1, wherein the first connection pipe is provided with a second pipe configured to reduce a supply pressure of condensed minerals that are supplied through the second channel.

5. The drinking water supply device according to claim 1, wherein the pressure sensor is provided further upstream of the second channel than the mineral supply valve.

6. The drinking water supply device according to claim 1, wherein the pump is an air pump to suction external air and to inject the suctioned external air into the mineral container.

7. The drinking water supply device according to claim 6, wherein the mineral container is provided with an injection hole at a lower part through which external air is injected into the mineral container and a discharge hole through which the condensed minerals are discharged from the mineral container, and wherein the injection hole is connected to the air pump via a third channel, and the discharge hole is connected to the second channel via a second connection pipe.

8. The drinking water supply device according to claim 7, further comprising:
   a container fastener configured to fasten at a lower side to the mineral container, wherein
   the injection hole and the discharge hole are formed at a lower end of the container fastener.

9. The drinking water supply device according to claim 1, further comprising:
   a second connection pipe provided between the second channel and the container fastener; and
   a drainage channel connected to the second connection pipe, wherein the drainage channel is provided with a drainage valve.

10. The drinking water supply device according to claim 9, wherein
   the drainage valve is controlled by the controller such that the drainage valve opens to discharge condensed minerals remaining in the mineral container when the mineral container is replaced, and
   the drainage valve is controlled by the controller such that the drainage valve opens for a third predetermined time when the pressure sensor senses a pressure value higher than the predetermined range of pressure when the mineral supply valve is closed.

* * * * *